United States Patent
Fujimaki et al.

(10) Patent No.: US 6,680,768 B2
(45) Date of Patent: Jan. 20, 2004

(54) LIQUID CRYSTAL DISPLAY DEVICE HAVING CHARACTERISTIC OF VIEWING ANGLE WHICH IS RIGHT-AND-LEFT SYMMETRICAL AND UP-AND-DOWN SYMMETRICAL

(75) Inventors: Eriko Fujimaki, Tokyo (JP); Kimikazu Matsumoto, Tokyo (JP); Shinichi Nishida, Tokyo (JP); Hiroaki Matsuyama, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 86 days.

(21) Appl. No.: 09/892,568

(22) Filed: Jun. 28, 2001

(65) Prior Publication Data

US 2001/0038431 A1 Nov. 8, 2001

Related U.S. Application Data

(62) Division of application No. 09/115,951, filed on Jul. 15, 1998, now Pat. No. 6,300,992.

(30) Foreign Application Priority Data

Jul. 15, 1997 (JP) .............................................. 9-190021

(51) Int. Cl.[7] .......................... G02F 1/1357; G02F 1/13
(52) U.S. Cl. ...................................... 349/128; 349/180
(58) Field of Search ................................ 349/128, 117, 349/141, 96, 180, 92

(56) References Cited

U.S. PATENT DOCUMENTS 5,280,375 A    1/1994    Tsuda et al.
5,488,499 A    1/1996    Tanaka et al.
5,576,867 A  * 11/1996   Baur et al. .................. 349/142

FOREIGN PATENT DOCUMENTS

| JP | S64-32229  | 2/1989  |
|----|------------|---------|
| JP | H2-5021    | 1/1990  |
| JP | H3-148636  | 6/1991  |
| JP | H5-88150   | 4/1993  |
| JP | 6-160878   | 6/1994  |
| JP | 7-191336   | 7/1995  |
| JP | 7-318959   | 12/1995 |
| JP | 8-190104   | 7/1996  |
| JP | 8-271919   | 10/1996 |
| JP | 10-3076    | 1/1998  |
| JP | 10-90713   | 4/1998  |
| JP | 11-30778   | 2/1999  |

OTHER PUBLICATIONS

Korean Office Action (translated) prepared on Jun. 26, 2000.

* cited by examiner

Primary Examiner—Toan Ton
(74) Attorney, Agent, or Firm—Sughrue Mion, PLLC

(57) ABSTRACT

In a liquid crystal display device comprising first and second substrates having first and second principal surfaces which are opposed to each other with a space left therebetween, first and second alignment layers are formed on the first and the second principal surfaces of the first and the second substrates. The first alignment layer is subjected to a first aligning treatment in a first aligning treatment direction while a second alignment layer is subjected to a second aligning treatment in a second aligning treatment direction which shifts from the first aligning treatment direction by a predetermined slight angle. Interposed between the first and the second alignment layers, a liquid crystal layer comprises a plurality of liquid crystal molecules each of which is twist aligned by a twist angle equal to the predetermined slight angle.

1 Claim, 14 Drawing Sheets

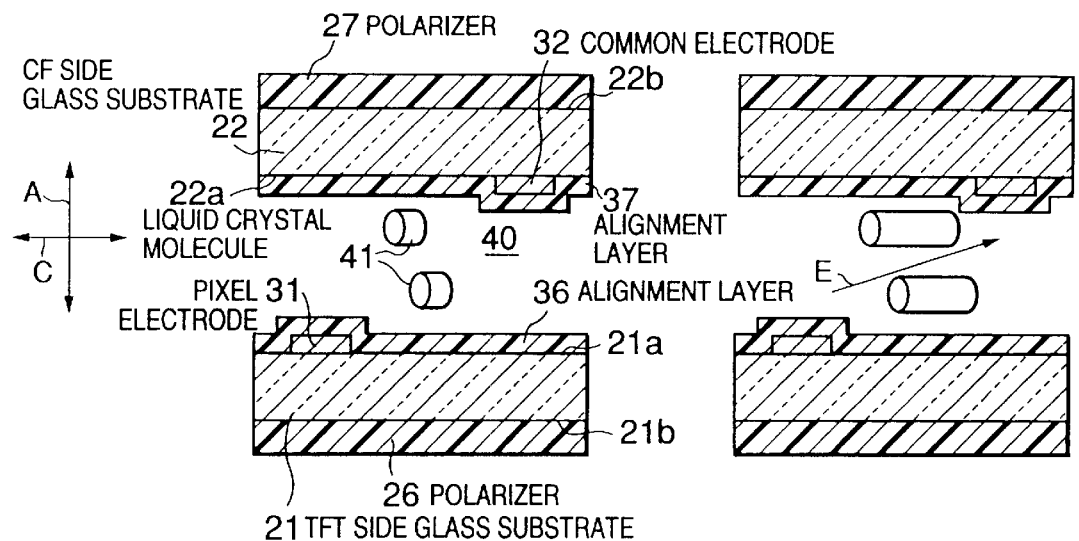
FIG. 1A PRIOR ART
FIG. 2A PRIOR ART
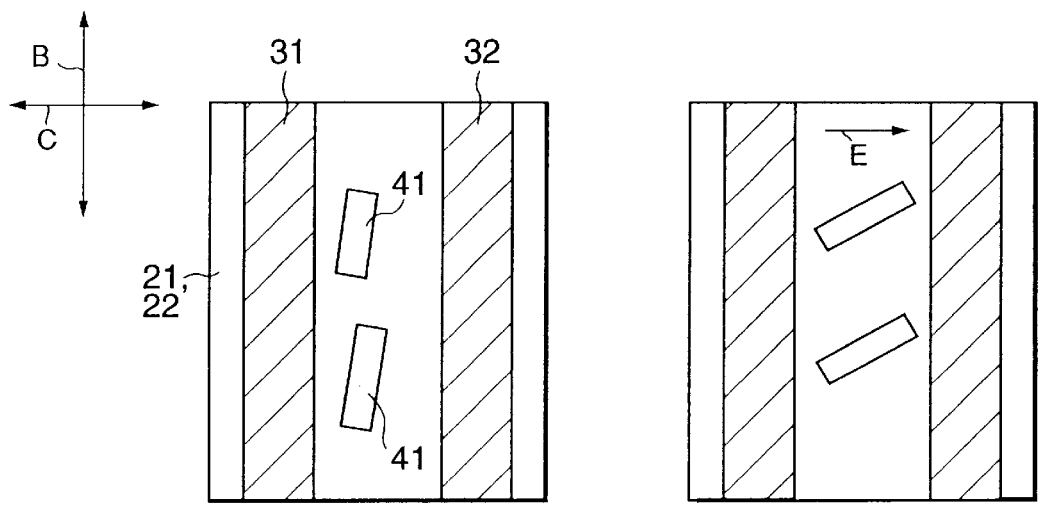
FIG. 1B PRIOR ART
FIG. 2B PRIOR ART $\phi\text{TFT}=16°$
$\phi\text{CF}=14°$
$\phi\text{TW}=+2°$
$\phi\text{AV}=15°$

LIQUID CRYSTAL DISPLAY DEVICE HAVING CHARACTERISTIC OF VIEWING ANGLE WHICH IS RIGHT-AND-LEFT SYMMETRICAL AND UP-AND-DOWN SYMMETRICAL

This is a divisional of application Ser. No. 09/115,951, filed Jul. 15, 1998, U.S. Pat. No. 6,300,992 the disclosure of which is incorporated herein by reference.

BACKGROUND OF THE INVENTION

This invention relates to a liquid crystal display device and, more particularly, to a liquid crystal display device having a wide viewing angle by carrying out display with molecule axes in liquid crystal molecules rotated in a plane which is substantially parallel to a surface of a substrate.

One of liquid crystal display device is a color TFT type liquid crystal display device in which thin film transistors (TFTs) are used as switching elements and which is capable of carrying out a color display.

A conventional liquid crystal display device is disclosed in Japanese Unexamined Patent Publication No. Hei 6-160878, namely, JP-A 6-160878. That is, JP-A 6-160878 obtains an active matrix type liquid crystal display device having such features that the contrast is high, visual angle property is good, a multi-level display can be easily performed, and that the display is bright and the cost is reduced. The active matrix type liquid crystal display device has such a structure that an electric field parallel to a substrate surface is impressed on a liquid crystal composition layer by a thin film transistor provided with a drain electrode and a common electrode which are extending over a plurality of picture elements and a source electrode extending in a direction same as that of the drain and the common electrodes.

In the manner which will later be described in conjunction with FIGS. 1A, 1B, 2A, and 2B in more detail, the conventional liquid crystal display device comprises first and second glass substrates spaced apart in a longitudinal direction. The first and the second glass substrates are substantially flat in shape. The first glass substrate has a first principal surface while the second glass substrate has a second principal surface opposed to the first principal surface via a space. In the manner known in the art, a plurality of thin film transistors (TFTs) are formed on the first principal surface of the first glass substrate in an array or matrix fashion. On the other hands, a plurality of color filters (CFs) are formed on the second principal surface in the manner known in the art.

The first glass substrate has a first back surface opposed to the first principal surface. A first polarizer is attached to the first back surface of the first glass substrate. Likewise, the second glass substrate has a second back surface opposed to the second principal surface. A second polarizer is attached to the second back surface of the second glass substrate. The first and the second polarizers may have first and second light transmission axes, respectively, which are perpendicular to each other.

A plurality of pixel electrodes are formed on the first principal surface of the first glass substrate in an array or matrix fashion. The pixel electrodes are equal in number to the thin film transistors and are called display electrodes. Each pixel electrode corresponds to a pixel and extends in a vertical direction or a panel up-and-down direction. Similarly, a plurality of common electrodes are formed on the second principal surface of the second glass substrate in the manner known in the art. Each common electrode extends in the vertical direction with its position shifted from that of the pixel electrode.

On the first principal surface of the first glass substrate, a first alignment layer 36 is formed or applied so as cover the pixel electrodes and the thin film transistors therewith. Likewise, a second alignment layer is formed or applied on the second principal surface of the second glass substrate so as to cover the common electrodes and the color filters therewith.

In addition, the first and the second glass substrates put a liquid crystal layer between the first and the second alignment layers. The liquid crystal layer includes a plurality of liquid crystal molecules. Each liquid crystal molecule has a long axis and a short axis. The long and short axes of each liquid crystal molecule lies in a plane which is substantially parallel to the surfaces of the first and the second glass substrates and which is defined by both of the vertical direction and a lateral direction. The long axis of each liquid crystal molecule extends in a direction which is called a director in the art. Both of the first and the second alignment layers are subjected to alignment treatment so that the director of each liquid crystal molecule inclines to one side from the vertical direction of the pixel electrodes and the common electrodes by a predetermined angle. This is because there is a chance that a display is poor due to occurrence of domain in the boundaries at which two deformations occur in the opposite direction if the director of each liquid crystal molecule is parallel to the vertical direction. At any rate, the liquid crystal molecules are uniformly aligned upon no generation of the electric field between the pixel electrodes and the common electrodes.

When a lateral electric field generates between the pixel electrode and the common electrode, each liquid crystal molecule rotate in the plane which is substantially parallel to the first and the second principal surfaces of the first and the second glass substrates and so that the director of each liquid crystal molecule is turned in a different direction on no generation of the lateral electric field.

Although the pixel electrodes and the common electrodes are formed on the substrates which are different from each other, JP-A 6-160878 teaches that the pixel electrodes and the common electrodes may be formed on the same substrate.

As described above, the liquid crystal display device of the IPS mode carries out display by rotating each liquid crystal molecule in a plane which is substantially parallel to the surfaces of the substrates caused by generation of the lateral electric field in a plane which is substantially parallel to the surfaces of the substrates. Accordingly, when a person sees or watches the liquid crystal display device from the front, the person's eyes basically receive light passing through the short axis of each liquid crystal molecule alone although the person moves his or her observing point in a predetermined view range. As a result, the liquid crystal display device of the IPS mode has no dependency on a visual field angle caused by a "rising way" of each liquid crystal molecule and it is possible for the liquid crystal display device to achieve a wider viewing angle in comparison with a liquid crystal display device of a twisted nematic (TN) mode. This is because the person's eyes receive light passing through the long axis as well as the short axis of each liquid crystal molecule in the liquid crystal display device of the TN mode when the person moves his or her observing point in the predetermined view range.

By the way, from a point of view in use conditions or the like, it is necessary for the liquid crystal display device that a contrast ratio related to the viewing angle in the panel right-and-left direction or the lateral direction is symmetrical and a contrast ratio related to the viewing angle in the panel up-and-down direction or the vertical direction is also symmetrical. In other words, it is necessary that the liquid crystal display device has not only a right-to-left symmetrical characteristic of the viewing angle in the right-and-left direction but also a up-and-down symmetrical characteristic of the viewing angle in the panel up-and-down direction. Furthermore, it is desirable that the liquid crystal display device has a symmetrical characteristic of the viewing angle in all of the up-and-down direction and the right-and-left direction. Herein, the contrast ratio (CR) is the ratio of a light transmittance in a state where white is displayed to a light transmittance in a state where black is displayed. In addition, the characteristic of the viewing angle (or an equivalent CR distribution) is a distribution characteristic indicating that how is the contrast ratio distributed for each viewing angle where the person looks in at the panel of the liquid crystal display device.

In the manner which will later be described in conjunction with FIG. 3 in more detail, the characteristic of the viewing angle according to the conventional liquid crystal display device is substantially oval in shape and is neither right-and-left symmetrical nor up-and-down symmetrical. More specifically, in the characteristic of the viewing angle according to the conventional liquid crystal display device, the oval shape of the viewing angle has a major axis which inclines to the right from the panel up-and-down direction by fifteen degrees which are identical with that for the alignment treatment direction of the first and the second alignment layers. This is because the alignment treatment is carried out on the first and the second alignment layers so as to incline to the right from the panel up-and-down direction by fifteen degrees and then the liquid crystal molecules are aligned so that the director of each liquid crystal molecules inclines to the right from the panel up-and-down direction on no generation of the lateral electric field.

As a result, the conventional liquid crystal display device of the IPS mode is disadvantageous in that demands related to the above-mentioned characteristics of the viewing angle are difficult to satisfy.

Other liquid crystal display devices are already known. By way of example, Japanese Unexamined Patent Publication No. Hei 8-190104, namely, JP-A 8-190104 discloses a liquid crystal display element which improves a display grade by suppressing the dependency on a visual field angle or a viewing angle. The liquid crystal display element according to JP-A 8-190104 comprises a first electrode having a plurality of pieces of parallel wire-shaped electrode parts formed on one substrate, a second electrode having a plurality of pieces of parallel wire-shaped electrode parts arranged between the respective wire-shaped electrode parts of the first electrode, and a switching element. Orientation or alignment films have the pretilt angle equal to or less than three degrees and the orientation or alignment direction parallel to the longitudinal direction of the wire-shaped electrode parts. An inter-electrode spacing G and the spacing D between both substrates satisfy the following equation: $0.5 \leq G/D \leq 3.0$. Inasmuch as this element is not of a type of erect or lay liquid crystals by a change in electric fields, the degradation in transmittance by a difference in the refractive index between the major or long axis direction and minor or short axis direction of the liquid crystals hardly arises. The dependency on the visual field angle is thus suppressed and the display grade is improved.

An electro-optical display device is disclosed in U. S. Pat. No. 5,576,867 issued to Baur et al. The electro-optical display device according to Baur et al. comprises a liquid crystal layer and achieves switching using an electric field component which is predominantly parallel to the surface of the liquid crystal layer. Low dependence of image contrast on viewing angle is achieved by selection of parameters including orientation angle $\beta_0$ and pretilt angle $\alpha_0$ of the liquid crystal molecules in the layer. For example, good results are achieved when $0°<\beta_0 \leq 20°$ for liquid crystal molecules having negative dielectric anisotropy and $70° \leq -\beta_0 <90°$ for molecules having positive dielectric anisotropy. Preferably, $0° \leq \alpha_0 <30°$.

Japanese Unexamined Patent Publication No. Hei 7-191336, namely, JP-A 7-191336 provides a liquid crystal display device controlled by lateral electric field which has a wide visual field angle, a fast response speed, and superior display control. The liquid crystal display device according to JP-A 7-191336 is provided with a couple of substrates, at least two display electrodes which are formed on one of the substrate while insulated form each other, and a liquid crystal material held between the couple of substrates with the couple of substrates opposed to each other so that the display electrodes are inside. The alignment state of liquid crystal molecules in the liquid crystal material is varied by providing a potential difference between the display electrodes to make a display by controlling rotary polarization performance. This direct view type or projection type liquid crystal display device has the display electrodes formed of inter-digital electrodes having a plurality of teeth, which are partially increased in width into a shape which can control the alignment state so that the alignment state is varied in one direction.

However, in each of the afore-mentioned references, each liquid crystal display device has the characteristic of the viewing angle which is neither right-and-left symmetrical nor up-and-down symmetrical.

SUMMARY OF THE INVENTION

It is therefore an object of the present invention to provide a liquid crystal display device which has a characteristic of a viewing angle being right-and-left symmetrical and being up-and-down symmetrical.

Other objects of this invention will become clear as the description proceeds.

In order to resolve the above-mentioned problems, the present inventors made an experiment as regards characteristic of a viewing angle in a case where liquid crystal molecules are not uniformly aligned. As a result, the present inventors disclose that the characteristic of the viewing angle rotates in accordance with a twist angle by twist aligning the liquid crystal molecules by the twist angle using a pair of alignment layers formed on a pair of substrates that are subjected to alignment treatment at alignment treatment angles which are slightly different from each other. On repeating the experiment, the present inventors disclose that it is possible to obtain the characteristic of the viewing angle being right-and-left symmetrical and being up-and-down symmetrical by determining the twist angle in accordance with an average angle between the alignment treatment angles.

Upon examining experimental results statistically, this invention provides, as embodied means for resolving the above-mentioned problems, a liquid crystal display device in the manner which will presently be described.

Specifically, according to an aspect of this invention, a liquid crystal display device comprises first and second substrate having first and second principal surfaces, respectively, which are opposed to each other with a space left therebetween. First and second alignment layers are formed on the first and the second principal surfaces of the first and the second substrate, respectively. The first alignment layer is subjected to a first aligning treatment in a first aligning treatment direction while the second alignment layer is subjected to a second aligning treatment in a second aligning treatment direction which shifts from the first aligning treatment direction by a predetermined slight angle. A liquid crystal layer is interposed between the first and the second alignment layers. The liquid crystal layer comprises a plurality of liquid crystal molecules each of which is twist aligned by a twist angle equal to the predetermined slight angle.

BRIEF DESCRIPTION OF THE DRAWING

FIG. 1A shows a side sectional view of a conventional liquid crystal display device on no generation of an electric field;

FIG. 1B shows a front view of the conventional liquid crystal display device illustrated in FIG. 1A;

FIG. 2A shows a side sectional view of the conventional liquid crystal display device illustrated in FIG. 1A on generation of the electric field;

FIG. 2B shows a front view of the conventional liquid crystal display device illustrated in FIG. 2A;

DESCRIPTION OF THE PREFERRED EMBODIMENTS

Figure 3:
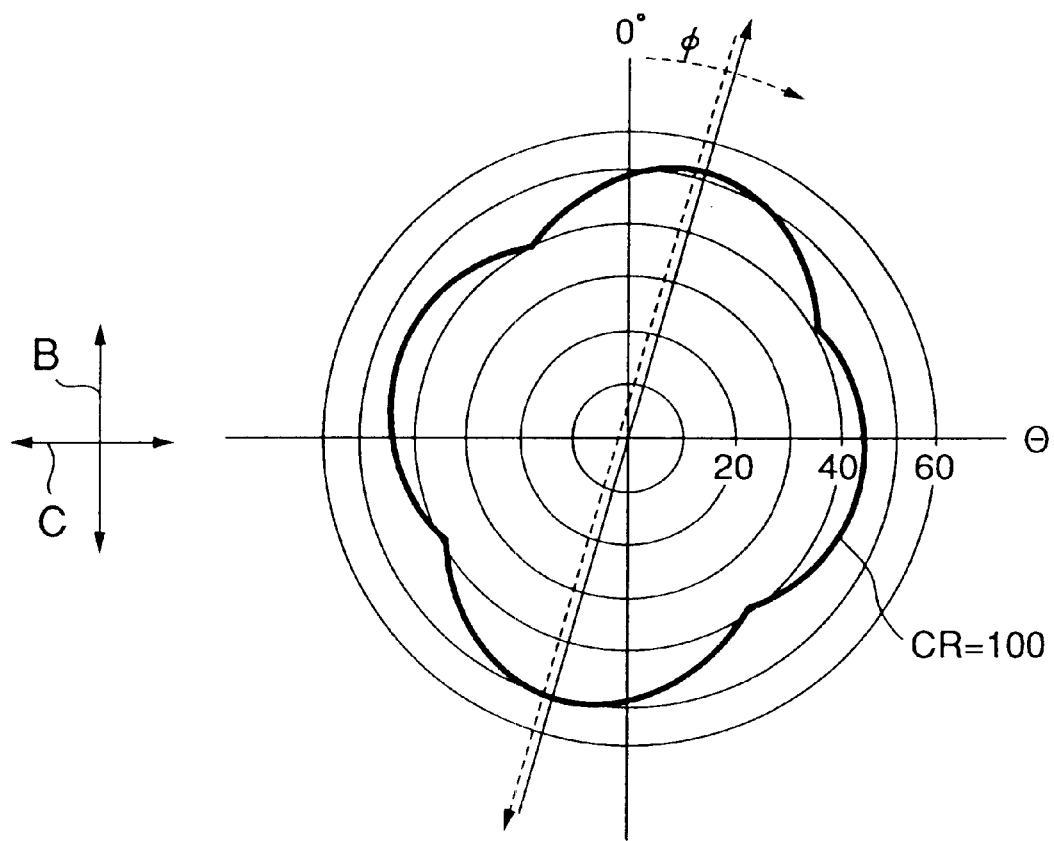
FIG. 3 shows, as a characteristics of a viewing angle in the conventional liquid crystal display device illustrated in FIGS. 1A through 2B, a viewing corn which schematically represents a contrast ratio in dependency on the viewing angle.

Referring to FIGS. 1A and 1B, and 2A and 2B, a conventional liquid crystal display device will be described in order to facilitate an understanding of the present invention. The illustrated conventional liquid crystal display device is disclosed in Japanese Unexamined Patent Publication No. Hei 6-160878, namely, JP-A 6-160878 and is substantially equivalent to that disclosed in the publication. The illustrated liquid crystal display device is operable in an In-Plane Switching (IPS) mode in which display is carried out by rotating a molecule axis in each liquid crystal molecule in a plane which is substantially parallel to a surface of a substrate. In other words, a lateral electric field generates in a direction in the plane. The IPS mode is referred to as a lateral electric field driving type.

Each of FIGS. 1A and 1B, and 2A and 2B shows a part corresponding to only one pixel in the liquid crystal display device. FIG. 1A shows a side sectional view of the conventional liquid crystal display device when the lateral electric field is not generated therein while FIG. 1B shows a front view of the conventional liquid crystal display device when the lateral electric field is not generated therein. In addition, FIG. 2A shows a side sectional view of the conventional liquid crystal display device when the lateral electric field is generated therein while FIG. 2B shows a front view of the conventional liquid crystal display device when the lateral electric field is generated therein.

As shown in FIG. 1A, the liquid crystal display device comprises first and second glass substrates 21 and 22 spaced apart in a longitudinal direction indicated by A. In other words, the first and the second glass substrates 21 and 22 are parallel to each other with a space left therebetween. The first and the second glass substrates 21 and 22 are substantially flat in shape. The first glass substrate 21 has a first principal surface 21a while the second glass substrate 22 has a second principal surface 22a opposed to the first principal surface 21a via the space. In the manner known in the art, a plurality of thin film transistors (TFTs) (not shown) are formed on the first principal surface 21a of the first glass substrate 21 in an array or matrix fashion. Accordingly, the first glass substrate 21 is called a TFT side glass substrate. On the other hands, a plurality of color filters (CFs) (not shown) are formed on the second principal surface 22a in the manner known in the art. Therefore, the second glass substrate 22 is referred to as a CF side glass substrate.

The first glass substrate 21 has a first back surface 21b opposed to the first principal surface 21a via the first glass substrate 21. A first polarizer 26 is attached to the first back surface 21b of the first glass substrate 21. Likewise, the second glass substrate 22 has a second back surface 22b opposed to the second principal surface 22a via the second glass substrate 22. A second polarizer 27 is attached to the second back surface 22b of the second glass substrate 22. In the example being illustrated, the first and the second polarizers 26 and 27 have first and second light transmission axes, respectively, which are perpendicular to each other.

As shown in FIGS. 1A and 1B, a plurality of pixel electrodes 31 are formed on the first principal surface 21a of the first glass substrate 21 in an array or matrix fashion although only one pixel electrode 31 is illustrated in FIGS. 1A and 1B. The pixel electrodes 31 are equal in number to the thin film transistors and are called display electrodes. Each pixel electrode 31 corresponds to a pixel and extends in a vertical direction indicated by an arrow B or a panel up-and-down direction as shown in FIG. 1B. Similarly, a plurality of common electrodes 32 are formed on the second principal surface 22a of the second glass substrate 22 in the manner known in the art although only one common electrode 32 is illustrated in FIGS. 1A and 1B. Each common electrode 32 extends in the vertical direction B with its position shifted from that of the pixel electrode 31.

On the first principal surface 21a of the first glass substrate 21, a first alignment layer 36 is formed or coated so as cover the pixel electrodes 31 therewith. The thin film transistors may be or may not be covered with the first alignment layer 36. Likewise, a second alignment layer 37 is formed or coated on the second principal surface 22a of the second glass substrate 21 so as to cover the common electrodes 22 and the color filters therewith.

In addition, the first and the second glass substrates 21 and 22 put a liquid crystal layer 40 between the first and the second alignment layers 36 and 37. The liquid crystal layer 40 comprises a plurality of liquid crystal molecules 41 which are enclosed as shown in FIGS. 1A and 1B. Each liquid crystal molecule 41 has a long axis and a short axis. In the example being illustrated, the liquid crystal molecules 41 have positive dielectric anisotropy. The long and the short axes of each liquid crystal molecule 41 are laid in a plane which is substantially parallel to the surfaces of the first and the second glass substrates 21 and 22 and which is defined by both of the vertical direction B and a lateral direction indicated by an arrow C. The long axis of each liquid crystal molecule 41 extends in a direction which is called a director in the art. Both of the first and the second alignment layers 36 and 37 are subjected to an aligning treatment so that the director of each liquid crystal molecule 41 inclines to one side from the vertical direction B of the pixel electrodes 31 and the common electrodes 32 by a predetermined angle. In other words, the liquid crystal molecules 41 are uniformly aligned when the lateral electric field is not generated between the pixel electrodes 31 and the common electrodes 32, as shown in FIG. 1B.

With this structure, it will be assumed that the lateral electric field depicted at E is generated between the pixel electrode 31 and the common electrode 32, as shown in FIGS. 2A and 2B. In this event, each liquid crystal molecule 41 rotate in the plane which is substantially parallel to the first and the second principal surfaces 21a and 22a of the first and the second glass substrates 21 and 22 so that the director of each liquid crystal molecule 41 is turned in a different direction upon no generation of the lateral electric field, as shown in FIGS. 2A and 2B.

In the example being illustrated, the pixel electrodes 31 and the common electrodes 32 are formed on the substrates 21 and 22 which are different from each other. However, JP-A 6-160878 teaches that the pixel electrodes and the common electrodes may be formed on the same substrate which is, for example, the first glass substrate 21.

As described above, the liquid crystal display device of the IPS mode carries out display by rotating each liquid crystal molecule 41 in a plane which is substantially parallel to the surfaces of the substrates 21 and 22 caused by generation of the lateral electric field E in a plane which is substantially parallel to the surfaces of the substrates 21 and 22. Accordingly, when a person sees or watches the liquid crystal display device from the front, the person's eyes basically receive light passing through the short axis of each liquid crystal molecule 41 alone although the person moves his or her viewing point in a predetermined view range. As a result, the liquid crystal display device of the IPS mode has no dependency on a viewing angle caused by a "rising way" of each liquid crystal molecule and it is possible for the liquid crystal display device to achieve a wider viewing angle in comparison with a liquid crystal display device of a twisted nematic (TN) mode. This is because the person's eyes receive light passing through the long axis as well as the short axis of each liquid crystal molecule in the liquid crystal display device of the TN mode when the person moves his or her viewing point in the predetermined view range.

By the way, from a point of view in use states or the like, it is necessary for the liquid crystal display device that a contrast ratio related to the viewing angle in the panel right-and-left direction or the lateral direction C is symmetrical and a contrast ratio related to the viewing angle in the panel up-and-down direction or the vertical direction B is also symmetrical. In other words, it is necessary that the liquid crystal display device has not only a right-to-left symmetrical characteristic of the viewing angle but also a up-and-down symmetrical characteristic of the visual viewing angle. Furthermore, it is desirable that the liquid crystal display device has a symmetrical characteristic of the viewing angle in all of the panel up-and-down direction and the panel right-and-left direction. Herein, the contrast ratio (CR) is the ratio of a light transmittance in a state where white is displayed to a light transmittance in a state where black is displayed. In addition, the characteristic of the viewing angle (or an equivalent CR distribution) is a distribution characteristic indicating that how is the contrast ratio distributed for each viewing angle where the person looks in at the panel of the liquid crystal display device.

However, the conventional liquid crystal display device of the IPS mode is disadvantageous in that demands related to the above-mentioned characteristics of the viewing angle are difficult to satisfy in the manner which will presently be described.

FIG. 3 shows, as an example of the characteristic of the viewing angle in the conventional liquid crystal display device, a viewing corn which schematically represents the contrast ratio in dependency on the viewing angle. In FIG. 3, $\theta$ represents an angle between a direction normal to the panel and a line of sight and $\phi$ represents an intra-plane angle between a bottom-to-top direction and a line where the line of sight is projected on the panel. The angle $\theta$ is called the viewing angle while the angle $\phi$ is herein referred to as a visual intra-plane angle or a visual azimuth angle. In the example being illustrated, the bottom-to-top direction is defined as a reference direction of zero degree in the visual azimuth angle $\phi$. In other words, the visual azimuth angle $\phi$ is equal to zero degree when a person looks in the panel in an oblique downward direction. The visual azimuth angle $\phi$ is expressed as an angular distance from the reference direction and is measured from 0° at the reference direction (the bottom-to-top direction) clockwise through 360° as shown in FIG. 3. The viewing angle $\theta$ is represented by concentric circles along in a radial direction as shown in FIG. 3.

FIG. 3 shows the distribution (the equivalent contrast curve) of CR=100 in a case where both of the first and the second alignment layers 36 and 37 have an aligning treatment direction which inclines to right side (clockwise) from the vertical direction B or the panel up-and-down direction by fifteen degrees. In addition, a first rubbing treatment or a first aligning treatment is carried out on the first alignment layer 36 in a first rubbing direction which inclines to the right side from the bottom-to-top direction or the reference direction by fifteen degrees (15°) as depicted at a solid arrow in FIG. 3. On the other hand, a second rubbing treatment or a second alignment treatment is carried out on the second alignment layer 37 in a second rubbing direction which inclines to the right side from the bottom-to-top direction by one hundred and ninety-five degrees (195°) as depicted at a broken arrow in FIG. 3. In other words, the first and the second alignment layers 36 and 37 are subjected to the rubbing treatments or the aligning treatments in the opposite direction. The first and the second rubbing directions are referred to as anti-parallel directions each other in the manner known in the art. At any rate, the first and the second alignment layers 36 and 37 are put into a anti-parallel rubbing state. Under the circumstances, the first and the second alignment layers 36 and 37 make the liquid crystal molecules 41 uniformly align so that the director of each liquid crystal molecule 41 inclines to the right side from the vertical direction B by fifteen degrees. Such an alignment for the liquid crystal molecules 41 is called a uniform or homogeneous alignment in the art.

It is understood from FIG. 3 that the characteristic of the viewing angle according to the conventional liquid crystal display device has the equivalent contrast curve which is substantially oval in shape and which is neither right-and-left symmetrical nor up-and-down symmetrical. More specifically, in the characteristic of the viewing angle according to the conventional liquid crystal display device, the oval shape of the equivalent contrast curve has a major axis which inclines to the right side from the vertical direction B by fifteen degrees and which is identical with the aligning treatment direction. This is because the aligning treatment or the rubbing treatment is carried out on the first and the second alignment layers so as to incline to the right side from the vertical direction B by fifteen degrees and then the liquid crystal molecules 41 are uniformly aligned so that the director of each liquid crystal molecules 41 inclines to the right side from the vertical direction B by fifteen degrees upon no generation of the lateral electric field.

Figure 4:
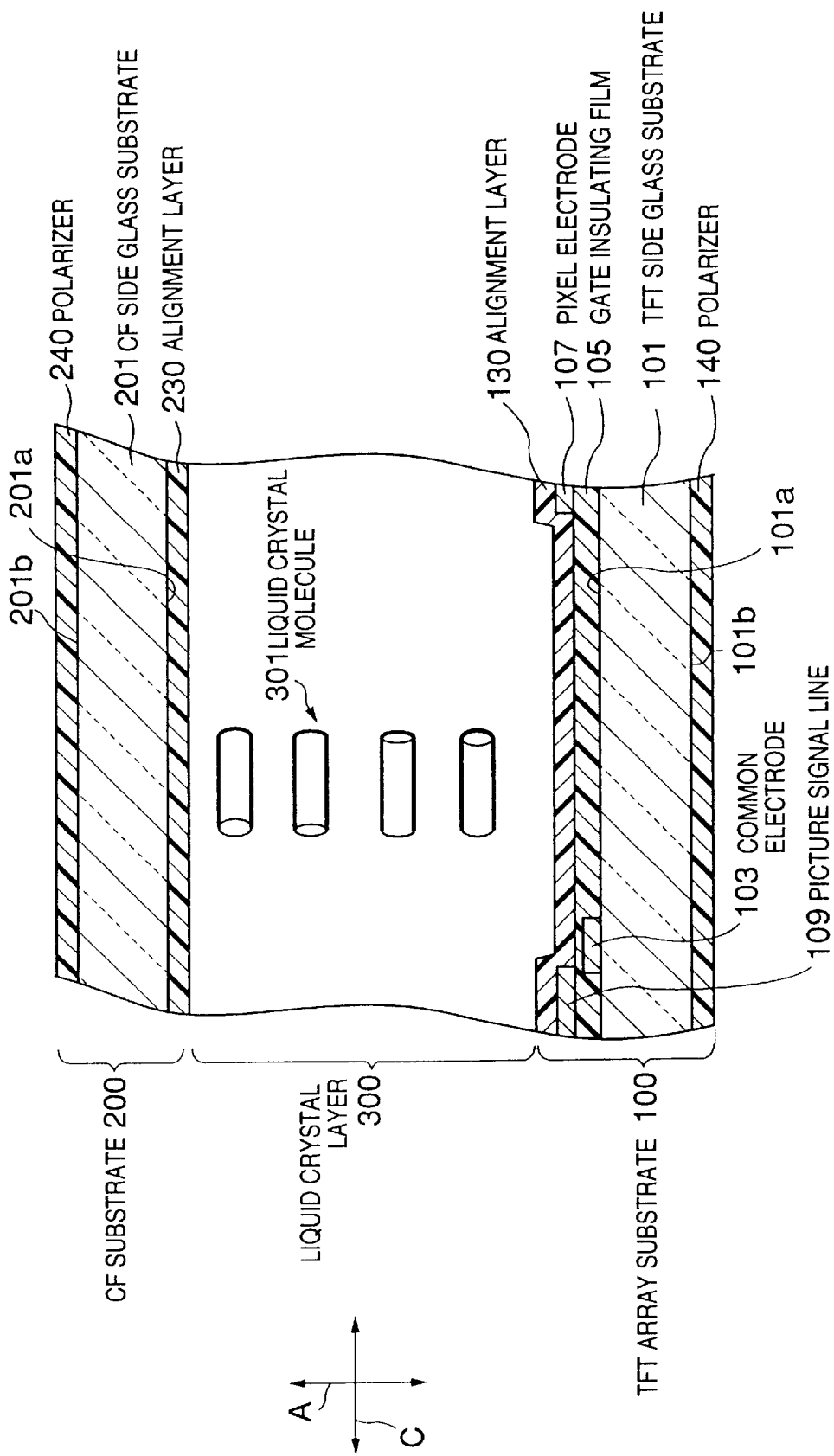
FIG. 4 is a cross-sectional side view of a liquid crystal display device according to a first embodiment of this invention, taken substantially along the lines 4—4 of FIG. 5.
Figure 5:
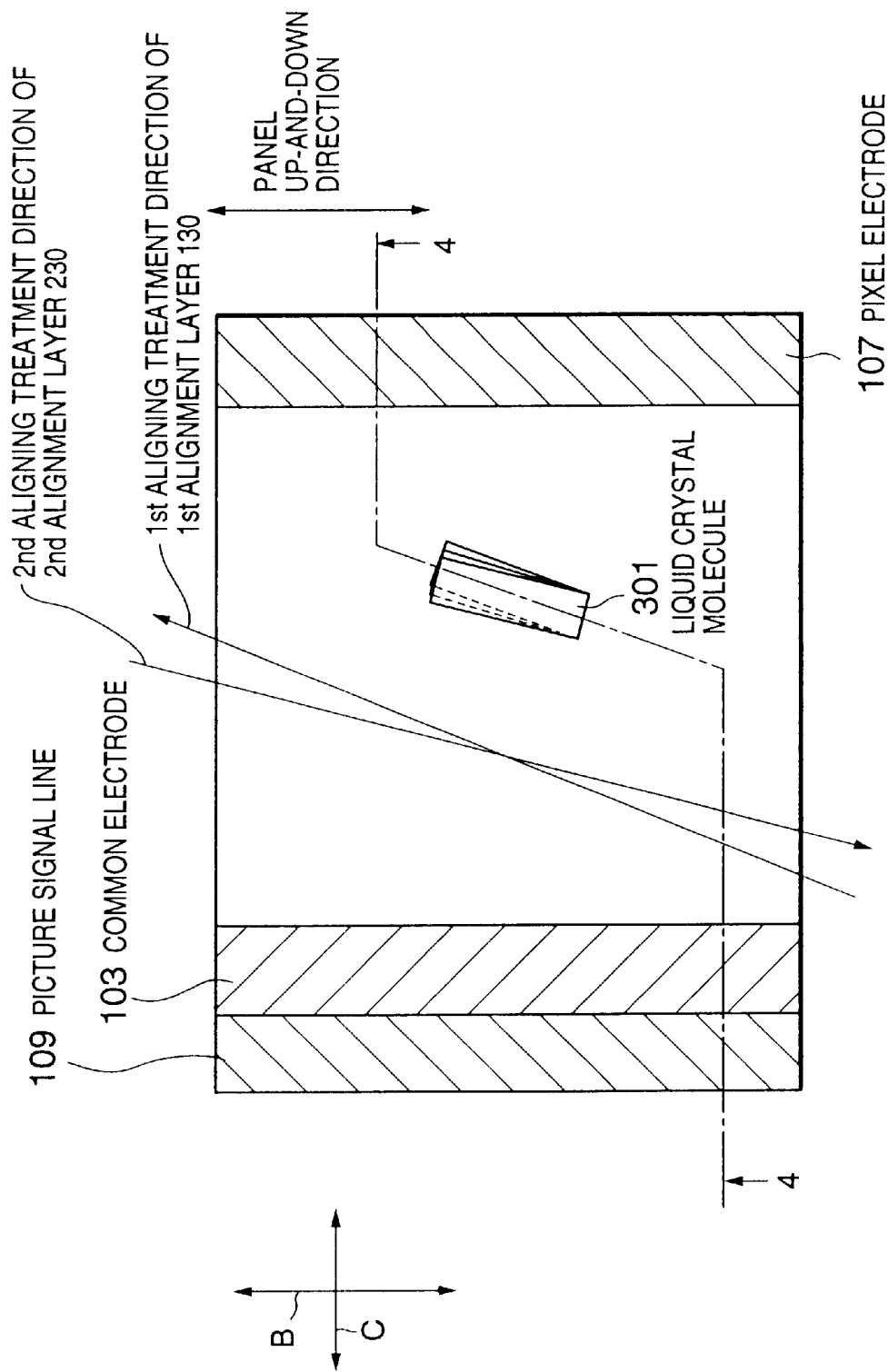
FIG. 5 is a front view of the liquid crystal display device illustrated in FIG. 4, as seen from a color filter side.

Referring to FIGS. 4 and 5, the description will proceed to a liquid crystal display device according to a first embodiment of this invention. Each of FIGS. 4 and 5 shows a structure of a part corresponding to one pixel of the liquid crystal display device. FIG. 4 is a cross-sectional side view of the liquid crystal display device while FIG. 5 is a front view of the liquid crystal display device as seen from a color filter side. In the manner known in the art, the liquid crystal display device comprises a liquid crystal display panel and other elements. However, FIGS. 4 and 5 shows the liquid crystal display panel alone. In the example being illustrated, the liquid crystal display device is a color TFT type liquid crystal display device in which thin film transistors (TFTs) are used as switching elements and which is capable of carrying out a color display.

The illustrated liquid crystal display device or panel comprises a thin film transistor array substrate (which is hereunder called a TFT array substrate) 100, a color filter substrate (which is hereunder called a CF substrate) 200, and a liquid crystal layer 300 which is interposed between the TFT array substrate 100 and the CF substrate 200. The TFT array substrate 100 and the CF substrate 200 are spaced via the liquid crystal layer 300 apart in a longitudinal direction indicated by an arrow A in FIG. 4.

The TFT array substrate 100 comprises a TFT side glass substrate 101 which is a flat plate in shape. The TFT side glass substrate is called a first substrate. The TFT array substrate 100 has a TFT principal surface 101a and a TFT back surface 101b which are opposed to each other via the TFT side glass substrate 101. The TFT principal surface 101a and the TFT back surface 101b are referred to as a first principal surface and a first back surface, respectively. Each of the TFT principal surface 101a and the TFT back surface 101b is also referred to as a panel flat surface. The TFT array substrate 100 further comprises a common electrode 103 formed on the TFT principal surface 101a and a gate insulating film 105 formed on the TFT principal surface 101a so as cover the common electrode 103. The common electrode 103 extends in a vertical direction indicated by an arrow B as shown in FIG. 5. The vertical direction B is called a panel up-and-down direction. The TFT array substrate 100 also comprises a pixel electrode 107 formed on the gate insulating film 105, a picture signal line 109 formed on the gate insulating film 105, and a TFT side alignment layer 130 formed or coated on the gate insulating film 105 so as to cover the pixel electrode 107 and the picture signal line 109. The TFT side alignment layer 130 is called a first alignment layer. The pixel electrode 107 and the picture signal line 109 also extend in the vertical direction B as shown in FIG. 5. The TFT array substrate 100 further comprises a TFT side polarizer 140 attached to the TFT back surface 101b. The TFT side polarizer 140 is called a first polarizer.

The CF substrate 200 comprises a CF side glass substrate 201 which is flat plate in shape. The CF glass substrate 201 is referred to as a second substrate. The CF side glass substrate 201 has a CF principal surface 201a and a CF back surface 201b which are opposed to each other via the CF side glass substrate 201. The CF principal surface 201a and the CF back surface 201b are called a second principal surface and a second back surface, respectively. Each of the CF principal surface 201a and the CF back surface 201a is also referred to as the panel flat surface. The CF substrate 200 further comprises a CF side alignment layer 230 formed or coated on the CF principal surface 201a and a CF side polarizer 240 attached to the CF back surface 201b. The CF side alignment layer 230 is called a second alignment layer while the CF side polarizer 240 is called a second polarizer.

In the manner known in the art, each of the TFT side polarizer 140 and the CF side polarizer 240 has a light transmission axis and a light absorption axis which are perpendicular to each other. In the example being illustrated, the light transmission axis of the TFT side polarizer 140 is perpendicular to that of the CF side polarizer 240. In other words, the light absorption axis of the TFT side polarizer 140 is perpendicular to that of the CF side polarizer 240. In the manner which will later become clear, the light transmission or absorption axis of each of the TFT side polarizer 140 and the CF side polarizer 240 inclines to the right or left from the panel up-and-down direction or the vertical direction B. In addition, each of the TFT side alignment layer 130 and the CF side alignment layer 230 has a rubbing direction or an aligning treatment direction for liquid crystal molecules. In the manner which will later become clear, the rubbing direction of each of the TFT side alignment layer 130 and the CF side alignment layer 230 is substantially parallel to the light absorption axis of the TFT side polarizer 140 and is substantially perpendicular to the light absorption axis of the CF side polarizer 240. In other words, the rubbing direction of each of the TFT side alignment layer 130 and the CF side alignment layer 230 is substantially perpendicular to the light transmission axis of the TFT side polarizer 140 and is substantially parallel to the light transmission axis of the CF side polarizer 240.

The liquid crystal layer 300 is interposed between the TFT array substrate 100 and the CF substrate 200 with the TFT side alignment layer 130 and the CF side alignment layer 230 opposed to each other as shown in FIG. 4. The liquid crystal layer 300 comprises a plurality of liquid crystal molecules 301 which are laid in a space enclosed with the TFT side alignment layer 130 and the CF side alignment layer 230. In the example being illustrate, the liquid crystal molecules 301 have positive dielectric anisotropy.

With this structure, the liquid crystal display device can carry out display by rotating the liquid crystal molecules 301 in a plane which is substantially parallel to the surfaces of the substrates 100 and 200 in accordance with a lateral electric field when the lateral electric field is generated between the common electrode 103 and the pixel electrode 105.

It is understood in reference with FIGS. 4 and 5 that the liquid crystal display device schematically has characteristics in the manner which will presently be described.

Firstly, the TFT side alignment layer 130 and the CF side alignment layer 230 have first and second aligning treatment directions, respectively, which are slightly different from each other. Secondly, the liquid crystal molecules 301 in the liquid crystal layer 300 are twist aligned at a twist angle which is equal to an angle between the first and the second aligning treatment directions. Selection conditions related to the twist angle or the like will be later be described. Roughly speaking, when a twist alignment is performed on the liquid crystal molecules 301 by slightly twisting the liquid crystal molecules 301, a center line of an equivalent contrast curve rotates around an origin in accordance with the twist angle. In addition, the center line of the equivalent contrast curve is a line about which the equivalent contrast curve is symmetric with respect to the line in question. The center line of the equivalent contrast curve is called a symmetry axis.

Figure 6:
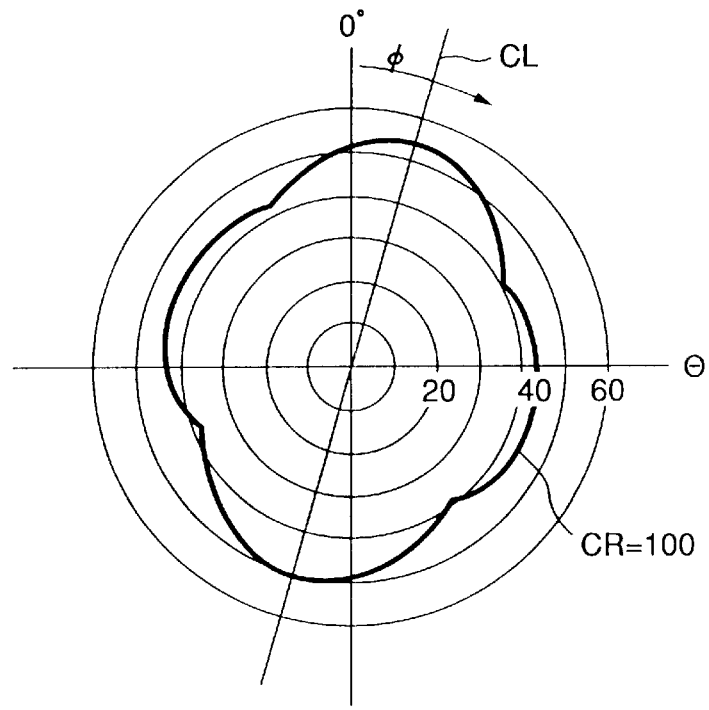
FIG. 6 shows an equivalent contrast curve which is identical with the FIG. 3.

Attention will direct to the equivalent contrast curve illustrated in FIG. 6 which is identical with the FIG. 3. It will be assumed that the equivalent contrast curve is approximately oval in shape which has a major axis and a minor axis as illustrated in FIG. 6. In this event, the center line CL or the symmetry axis is, for example, identical with the major axis of the approximately oval shape as shown in FIG. 6.

If the center line CL is set so that it extends in the vertical direction B, the equivalent contrast curve is symmetrical laterally or the panel right-and-left direction. If the center line CL is set so that it extends in a lateral direction indicated by an arrow C, the equivalent contrast curve is symmetrical up and down or in the panel up-and-down direction. Accordingly, rotation of the center line CL by a desired angle results in twist aligning the liquid crystal molecules 301 at the twist angle in accordance with the desired angle. As a result, it is possible to obtain the characteristic of the viewing angle being right-and-left symmetrical and being up-and-down symmetrical that are not obtained in prior art.

Figure 7:
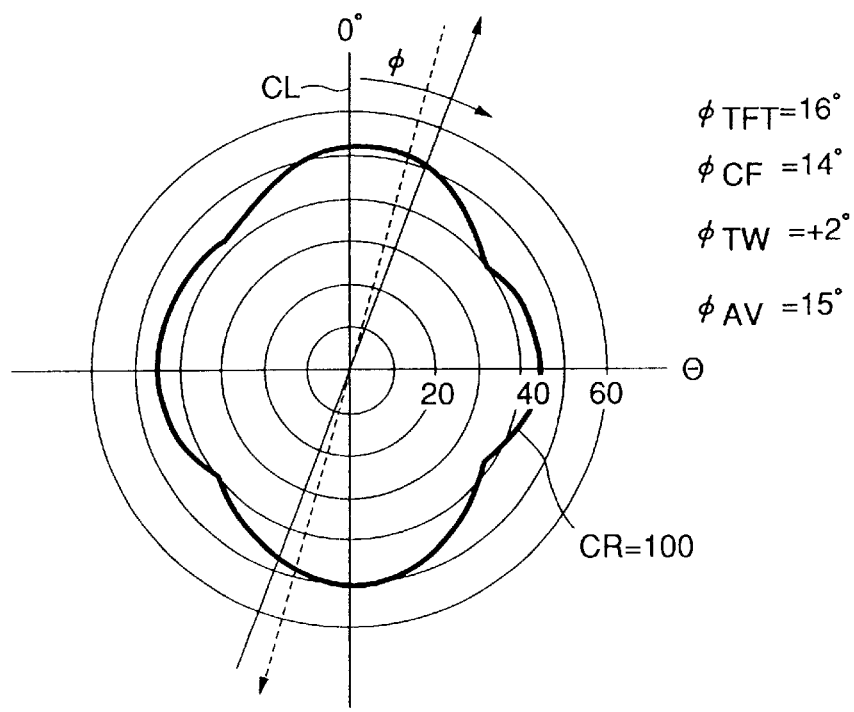
FIG. 7 exemplifies characteristic of a viewing angle being right-and-left symmetrical and being up-and-down symmetrical that can be obtained according to the liquid crystal display device illustrated in FIGS. 4 and 5 and shows an equivalent contrast curve where a TFT side aligning treatment angle $\phi$TFT and a CF side aligning treatment angle $\phi$CF are equal to 16° and 14°, respectively.

FIG. 7 exemplifies the characteristic of the viewing angle being the right-and-left symmetrical and being the up-and-down symmetrical that can be obtained according to the liquid crystal display device of the present invention.

Figure 8:
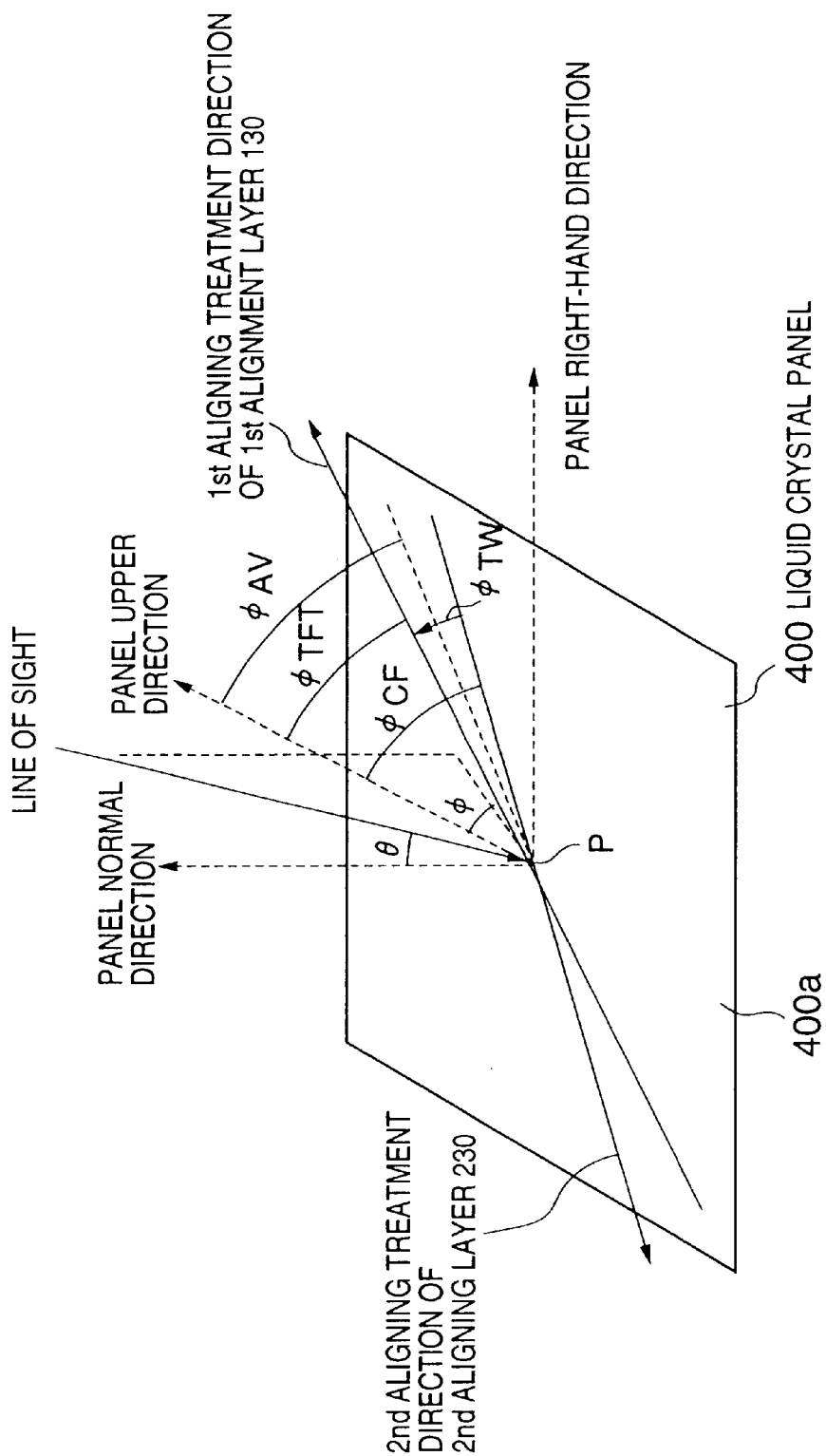
FIG. 8 is a perspective view of various angles for use in describing operation of the liquid crystal display device illustrated in FIGS. 4 and 5.

Referring to FIG. 8, description will proceed to various angles for use in describing operation of this embodiment of the present invention in detail.

Attention will be directed to a particular point P on a liquid crystal panel 400. In this embodiment of the present invention, the liquid crystal panel 400 has the front 400a where the liquid crystal panel 400 is looked with the CF substrate 200 arranged this side. Throughout this specification, an upper direction facing the front is defined as a panel upper direction and a right-hand direction facing the front is defined as a panel right-hand direction. In particular, inasmuch as each electrode such as the common electrode 103, the pixel electrode 107, and the picture signal line 109 has a longitudinal direction which extends in the vertical direction B or the panel up-and-down direction, the longitudinal direction of the electrode and the panel up-and-down direction extends in the same direction. Accordingly, any direction thereof may be used as a reference direction. In addition, a direction perpendicular to a surface of the liquid crystal panel 400 is defined as a panel normal direction and an angle between the panel normal direction and a line of sight seeing the particular point P is defined as the viewing angle θ. Furthermore, an angle between the panel upper direction and an arbitrary direction on the liquid crystal panel 400 is defined as an intra-plane angle and particularly, the intra-plane angle between the panel upper direction and a line where the line of sight is projected on the liquid crystal panel 400 is defined as the visual azimuth angle φ.

In addition, as understood from the above-mentioned definition, the visual azimuth angle φ has zero degree at the panel upper direction as the reference direction. Furthermore, as seen the liquid crystal panel from the front, a clockwise direction from the panel upper direction on the panel surface of the liquid crystal panel 400 is positive. In other words, the visual azimuth angle φ is measured from 0° at the reference direction clockwise through 360°.

In addition, as shown in FIG. 8, the intra-plane angle φbetween the panel upper direction and the first aligning treatment direction of the TFT side alignment layer 130 is defined as a TFT side aligning treatment angle φTFT while the intra-plane angle φ between the panel upper direction and the second aligning treatment direction of the CF side alignment layer 230 is defined as a CF side aligning treatment angle φCF. The TFT side aligning treatment angle φTFT is called a first aligning treatment angle while the CF side aligning treatment angle φCF is called a second aligning treatment angle.

Furthermore, an angle obtained by subtracting the CF side aligning treatment angle φCF from the TFT side aligning treatment angle φTFT, namely, (φTFT−φCF) is defined as a twist angle φTW. That is:

$$\phi TW = \phi TFT - \phi CF.$$

An intermediate angle between the TFT side aligning treatment angle φTFT and the CF side aligning treatment angle φCF is defined as an average aligning treatment angle φAV. That is:

$$\phi AV = (\phi TFT + \phi CF)/2.$$

Herein, in FIG. 7, a solid line with an arrow indicates the first aligning treatment direction of the TFT side alignment layer 130 and a broken line with an arrow indicates the second aligning treatment direction of the CF side alignment layer 230. From this event, it is understood, correctly speaking, that the second aligning treatment direction of the CF side alignment layer 230 inclines to the right side from the panel upper direction by an angle which is equal to the CF side aligning treatment angle φCF plus a straight angle or 180°. However, with respect to the second aligning treatment direction of the CF side alignment layer 230, the following will be assumed. If the second aligning treatment direction inclines to the right side from the panel upper direction by a larger angle more than the straight angle or 180° as illustrated in FIG. 7, the CF side aligning treatment angle φCF is equal to an angle obtained by subtracting the straight angle from the larger angle. On the other hand, if the second aligning treatment direction inclines to the right side from the panel upper direction by a smaller angle within the straight angle, the CF side aligning treatment angle φCF is equal to the smaller angle as it is.

The present inventors discover that the equivalent contrast curve rotates around the origin in response to the twist angle φTW. More specifically, if the twist angle φTW is zero degree, the center axis CL of the equivalent contrast curve corresponds to the aligning treatment direction as shown in FIGS. 3 and 6. However, the equivalent contrast curve rotates counterclockwise and clockwise around the origin when the twist angle φTW is positive and negative, respectively, as illustrated in FIGS. 7 and 9, in the manner which will presently be described.

FIG. 7 shows the equivalent contrast curve where the TFT side aligning treatment angle φTFT and the CF side aligning treatment angle φCF are equal to 16° and 14°, respectively. In this event, the twist angle φTW and the average aligning treatment angle φAV are equal to +2° and 15°, respectively. Under the circumstances, the equivalent contrast curve rotates counterclockwise around the origin by fifteen degrees so that the center line CL or the symmetry axis of the equivalent constant curve substantially coincides with the panel up-and-down direction. As a result, it is possible to obtain the characteristic of the viewing angle which is the right-and-left symmetrical and which is the up-and-down symmetrical.

Figure 9:
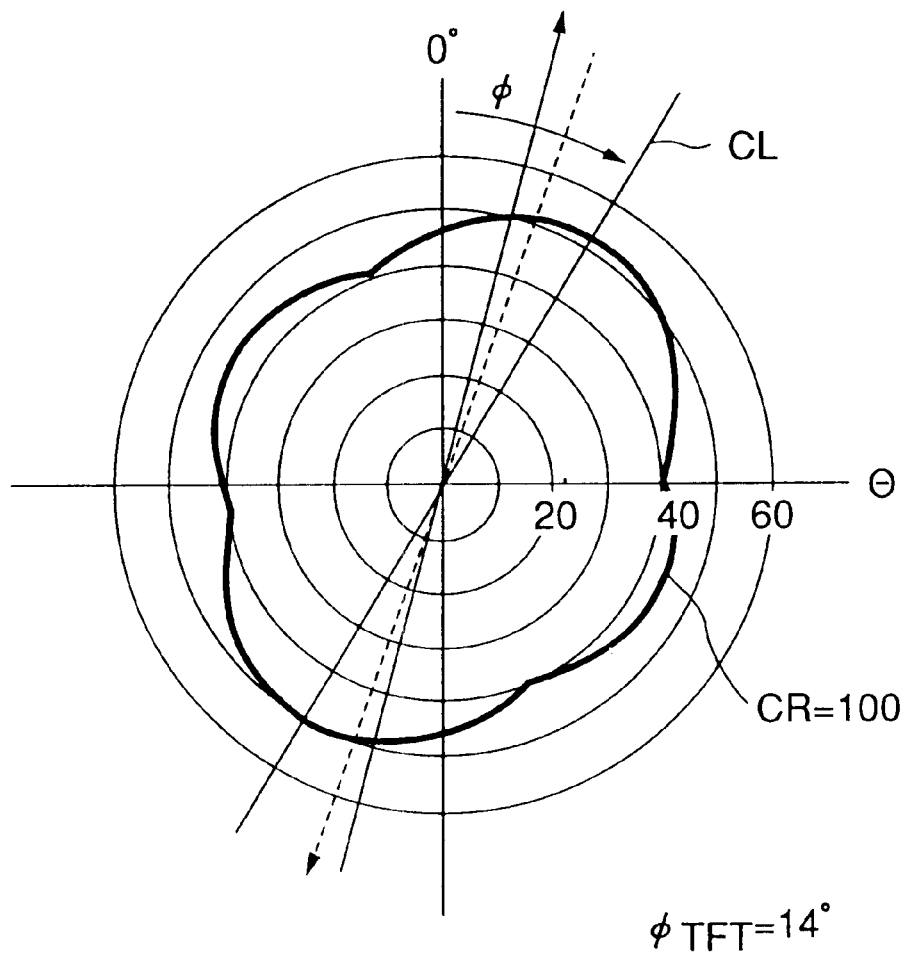
FIG. 9 shows another equivalent contrast curve where the TFT side aligning treatment angle $\phi$TFT and the CF side aligning treatment angle $\phi$CF are equal to 14° and 16°, respectively.

FIG. 9 shows another equivalent contrast curve where the TFT side aligning treatment angle φTFT the CF side aligning treatment angle φCF are equal to 14° and 16°, respectively. In this event, the twist angle φTW and the average aligning treatment angle φAV are equal to −2° and 15°, respectively. Under the circumstances, the equivalent contrast curve rotates clockwise around the origin by fifteen degrees so that the center line CL or the symmetry axis of the equivalent contrast curve inclines the right side from the panel up-and-down direction by about thirty degrees.

As apparent from FIGS. 7 and 9, it is understood that the equivalent contrast curve rotates around the origin by slightly shifting the first and the second rubbing directions for the TFT side alignment layer 130 and the CF side alignment layer 230 so as to twist align the liquid crystal molecules 301 by the twist angle φTW. In addition, as shown in FIG. 7, it is possible to obtain the characteristic of the viewing angle being the right-and-left symmetrical and being the up-and-down symmetrical by twisting the liquid crystal molecules 301 according to the present invention so as to control rotation of the equivalent contrast curve.

Figure 10:
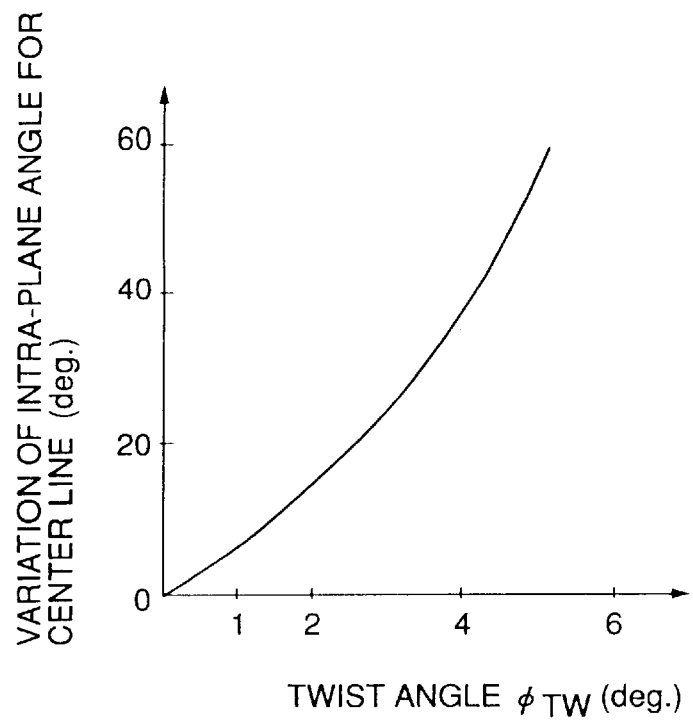
FIG. 10 shows experimental results which represent a relationship between a twist angle $\phi$TW and variation of an intra-plane angle between a center line CL and a panel up-and-down direction.

Referring to FIG. 10, the description will proceed to experimental results which represent a relationship between the twist angle φTW and variation of an intra-plane angle between the center line CL and the panel up-and-down direction. In FIG. 10, abscissa and ordinate represent an absolute value of the twist angle φTW (degree) and an absolute value of the variation of the intra-plane angle (degree) for the center line CL, respectively. In addition, it is understood from FIGS. 7 and 9 that the center line CL of the equivalent contrast curve rotates counterclockwise around the origin or the variation of the intra-plane angle for the center line CL is negative if the twist angle φTW is positive while the center line CL of the equivalent contrast curve rotates clockwise around the origin or the variation of the intra-plane angle for the center line CL is positive if the twist angle φTW is negative. Furthermore, it is understood from FIG. 10 that the larger the absolute value of the twist angle φTW becomes, the larger the absolute value of the variation of the intra-plane angle for the center line CL.

Figure 11:
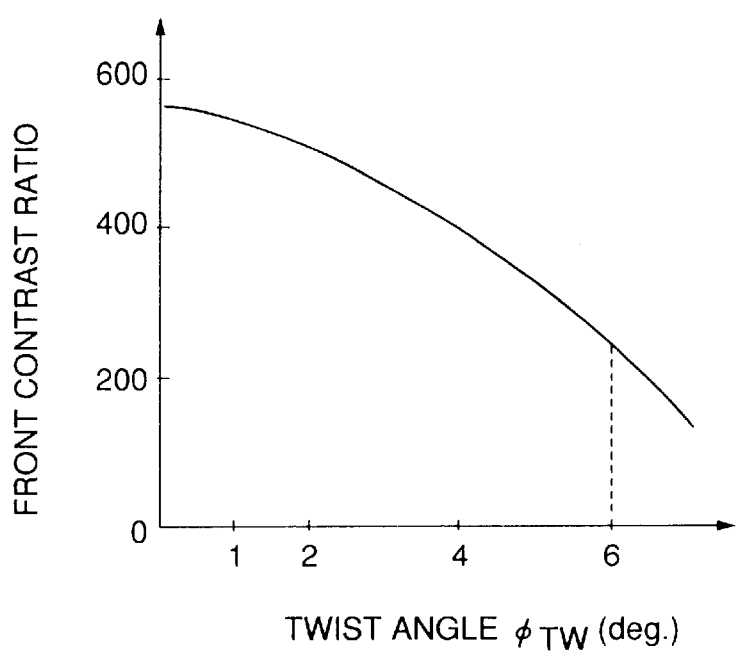
FIG. 11 shows a relationship between a front contrast ratio and the twist angle $\phi$TW.

However, if the absolute value of the twist angle φTW becomes larger too, it results in degradation of a front contrast ratio as shown in FIG. 11, in the manner which will presently be described.

FIG. 11 shows a relationship between the front contrast ratio and the twist angle φTW. In FIG. 11, abscissa and ordinate represent the absolute value of the twist angle φTW (degree) and the front contrast ratio, respectively. Herein, the "front contrast ratio" is the contrast ratio at the origin where each of the viewing angle θ and the visual azimuth angle φ is equal to zero degree (0°). As apparent from FIG. 11, the larger the twist angle φTW becomes, the smaller the front contrast ratio becomes. In general, it is necessary for the liquid crystal display device to have the front contrast ratio more than two hundreds (CR=200). It is understood from FIG. 11 that the absolute value of the maximum permissible twist angle φTW to twisting is about six degrees (6°).

Figure 12:
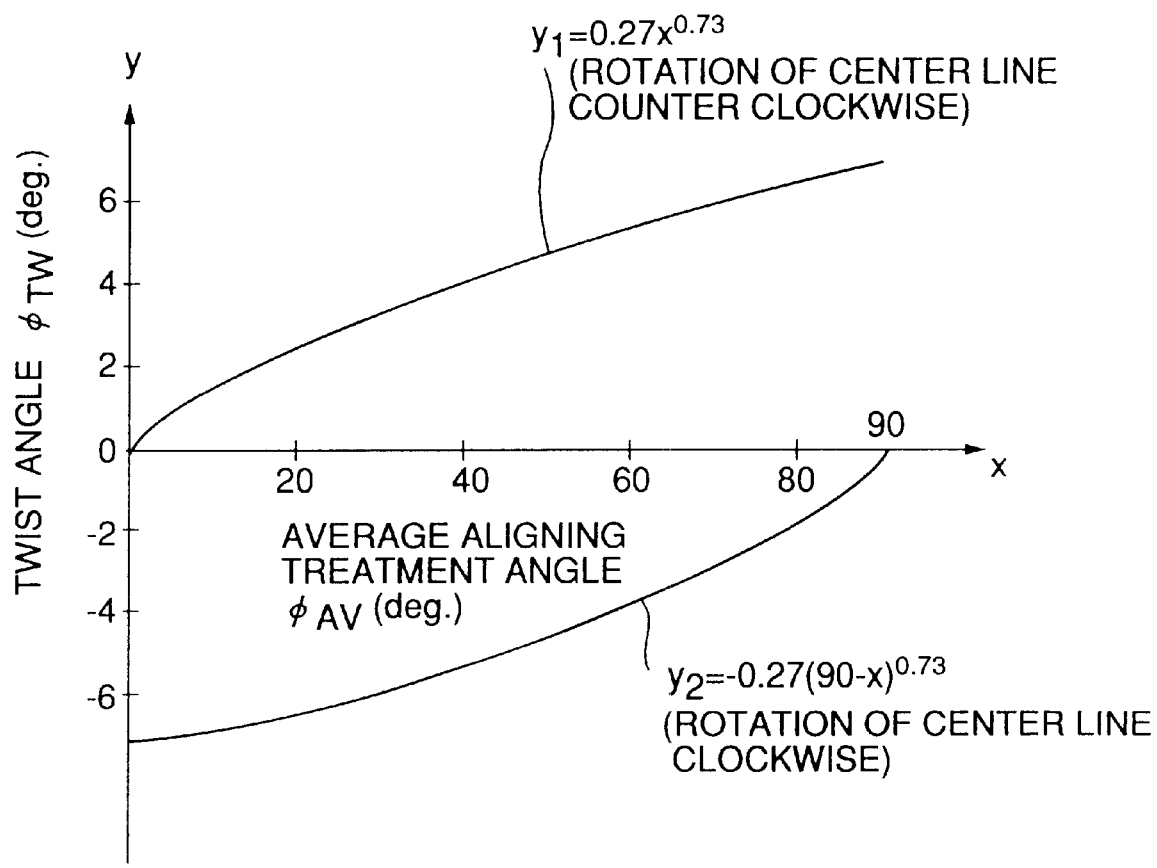
FIG. 12 shows a relationship between an average aligning treatment angle $\phi$AV and the twist angle $\phi$TW.

FIG. 12 shows a relationship between the average aligning treatment angle φAV and the twist angle φTW. In FIG. 12, abscissa and ordinate represent the average aligning treatment angle φAV (degree) and the twist angle φTW (degree), respectively. As shown in FIG. 12, the average aligning treatment angle φAV is represented by an independent variable of x while the twist angle φTW is represented by a dependent variable of y. Each of two curves (upper and lower curves $y_1$ and $y_2$) of in FIG. 12 indicates the twist angle φTW required for ensuring symmetry of the contrast ratio in both of the panel up-and-down direction and the panel right-and-left direction with respect to a given average aligning treatment angle φAV. As described above in conjunction with FIGS. 7 and 9, the center line CL of the equivalent contrast curve rotates counterclockwise around the origin if the twist angle φTW is positive while the center line CL of the equivalent contrast curve rotates clockwise around the origin if the twist angle φTW is negative. In FIG. 12, the upper curve $y_1$, in a range where the twist angle φTW is positive is a characteristic curve to make the center line CL of the equivalent contrast curve rotate counterclockwise around the origin while the lower curve $y_2$ in a range where the twist angle φTW is negative is a characteristic curve to make the center line CL of the equivalent contrast curve rotate clockwise around the origin.

More specifically, it will be assumed that the symmetry of the contrast ratio in both of the panel up-and-down direction and the panel right-and-left direction is ensured by making the center line CL of the equivalent contrast curve rotate counterclockwise around the origin. In this event, it is necessary that the liquid crystal molecules 301 are aligned with the liquid crystal molecules 301 twisted by the twist angle φTW on the upper curve $y_1$ which is represented by:

$$y_1 = 0.27 x^{0.73}.$$

In addition, it will be presumed that the symmetry of the contrast ratio in both of the panel up-and-down direction and the panel right-and-left direction is ensured by making the center line CL of the equivalent contrast curve rotate clockwise around the origin. Under the circumstances, it is necessary that the liquid crystal molecules 301 are aligned with the liquid crystal molecules 301 twisted by the twist angle φTW on the lower curve $y_2$ which is represented by:

$$y_2 = -0.27(90-x)^{0.73}.$$

It will be assumed that an allowable error range is a range between +1° and −1° in each case. In this event, the twist angle φTW or the upper curve $y_1$ and the lower curve $y_2$ are defined by as follows:

$$0.27x^{0.73} - 1 \leq y_1 \leq 0.27x^{0.73} + 1,$$

in a case where the TFT side aligning treatment angle φTFT is larger than the CF side aligning treatment angle φCF; and $$-0.27(90-x)^{0.73} - 1 \leq y_2 \leq -0.27(90-x)^{0.73} + 1,$$

in a case where the TFT side aligning treatment angle φTFT is smaller than the CF side aligning treatment angle φCF.

As apparent from this, it is possible to obtain the liquid crystal display device in which the symmetry of the contrast ratio in both of the panel up-and-down direction and the panel right-and-left direction is ensured by twisting the liquid crystal molecules 301 by the predetermined slight twist angle φTW in accordance with the above-mentioned conditions.

In general, in order to control rotation direction of each liquid crystal molecule 301 in one direction only on generation of an lateral electric field, the liquid crystal display device of the IPS mode has a structure where the liquid crystal molecules 301 are aligned so that the director of each liquid crystal molecule 301 incline to the right side from the panel up-and-down direction by a slight angle upon no generation of the lateral electric field. The slight angle may be equal or more about two degrees. However, the average aligning treatment angle φAV may desirably defined a range between ten degrees and forty-five degrees in the present invention. In the manner which will later be described, the reason why the average aligning treatment angle φAV must be set so that it is equal to or less than forty-five degrees is to obtain a high light transmittance in the liquid crystal display device. In addition, the reason why the average aligning treatment angle φAV must be set so that it is equal to or more than ten degrees is to make adjustment of gradation easy.

Turning back to FIGS. 4 and 5, it will be assumed that an applied voltage is supplied to the pixel electrode 107 to generate the lateral electric field between the pixel electrode 107 and the common electrode 103 that is parallel to the panel flat surface. In this event, each liquid crystal molecule 301 rotates in a plane which is substantially parallel to the panel flat surface. As described above, the light absorption axis of the TFT side polarizer 140 is substantially parallel to the rubbing direction of each of the TFT side alignment layer 130 and the CF side alignment layer 230. Herein, the light absorption axis of the TFT side poralizer 140 is called a poralizer absorption axis. Accordingly, the director of each liquid crystal molecule 301 is substantially parallel to the poralizer absorption axis upon no generation of the lateral electric field. An angle between the director of each liquid crystal molecule 301 and the poralizer absorption axis is defined as an included angle depicted at δ. Accordingly, the included angle δ is equal to zero degree upon no generation of the lateral electric field. As a result, the included angle δ changes in response to the applied voltage supplied to the pixel electrode 107.

In the manner which become clear as the description proceeds, it is necessary to change the included angle δ within a range between zero degree and ninety degrees. From the viewpoint of structure of the liquid crystal display device, the lateral electric field generates between the pixel electrode 107 and the common electrode 103 when the applied voltage is supplied to the pixel electrode 107. Although each liquid crystal molecule 301 rotates in accordance with the strength of the lateral electric field, each liquid crystal molecule 301 only rotates in a range where the long axis of the liquid crystal molecule 301 shifts from an initial aligned state to a direction in parallel to the panel right-and-left direction from no generation of the lateral electric field to generation of the lateral electric field no matter how high the lateral electric field may be generated. In addition to this, in the manner which will later become clear, the liquid crystal display device of the IPS mode has the highest light transmittance when the included angle δ is equal to forty-five degrees (45°) and has the lowest light transmittance when the included angle δ is equal to zero degree (0°) or ninety degrees (90°). As a result, the average aligning treatment angle φAV is limited to forty-five degrees (45°).

Description will proceed to the reason why the average aligning treatment angle φAV is limited to forty-five degrees (45°) in detail. In the liquid crystal display device of the IPS mode, the light transmittance $T/T_0$ is generally represented by:

$$T/T_0 = \sin^2(2\delta) \times \sin^2(\pi \Delta n d/\lambda),$$

where λ represents a wavelength of light, d represents an effective thickness of the liquid crystal layer 300, and Δn represents a refractive index anisotropy. As apparent from the above-mentioned formula, the light transmittance $T/T_0$ has the maximum value when the included angle δ is equal to forty-five degrees (45°) and has the minimum value when the included angle δ is equal to zero degree (0°) or ninety degrees (90°). As a result, it is necessary to make the liquid crystal molecules 301 rotate so that the included angle δ is equal to forty-five degrees (45°) and to zero degree (0°) in order that the light transmittance $T/T_0$ includes both of the minimum value and the minimum value from generation of the lateral electric field to no generation of the lateral electric field.

It will be assumed that the average aligning treatment angle φAV is larger than forty-five degrees (45°). In this event, each liquid crystal molecule 301 only rotates within a rotation movable range less than forty-five degrees (45°). As a natural result, it is impossible to make the included angle δ include both of forty-five degrees (45°) and to zero degree (0°) within the rotation movable range.

From the above-mention fact, it is understood that it is necessary to limit the average aligning treatment angle φAV to forty-five degrees (45°) to obtain the high light transmittance.

Figure 13:
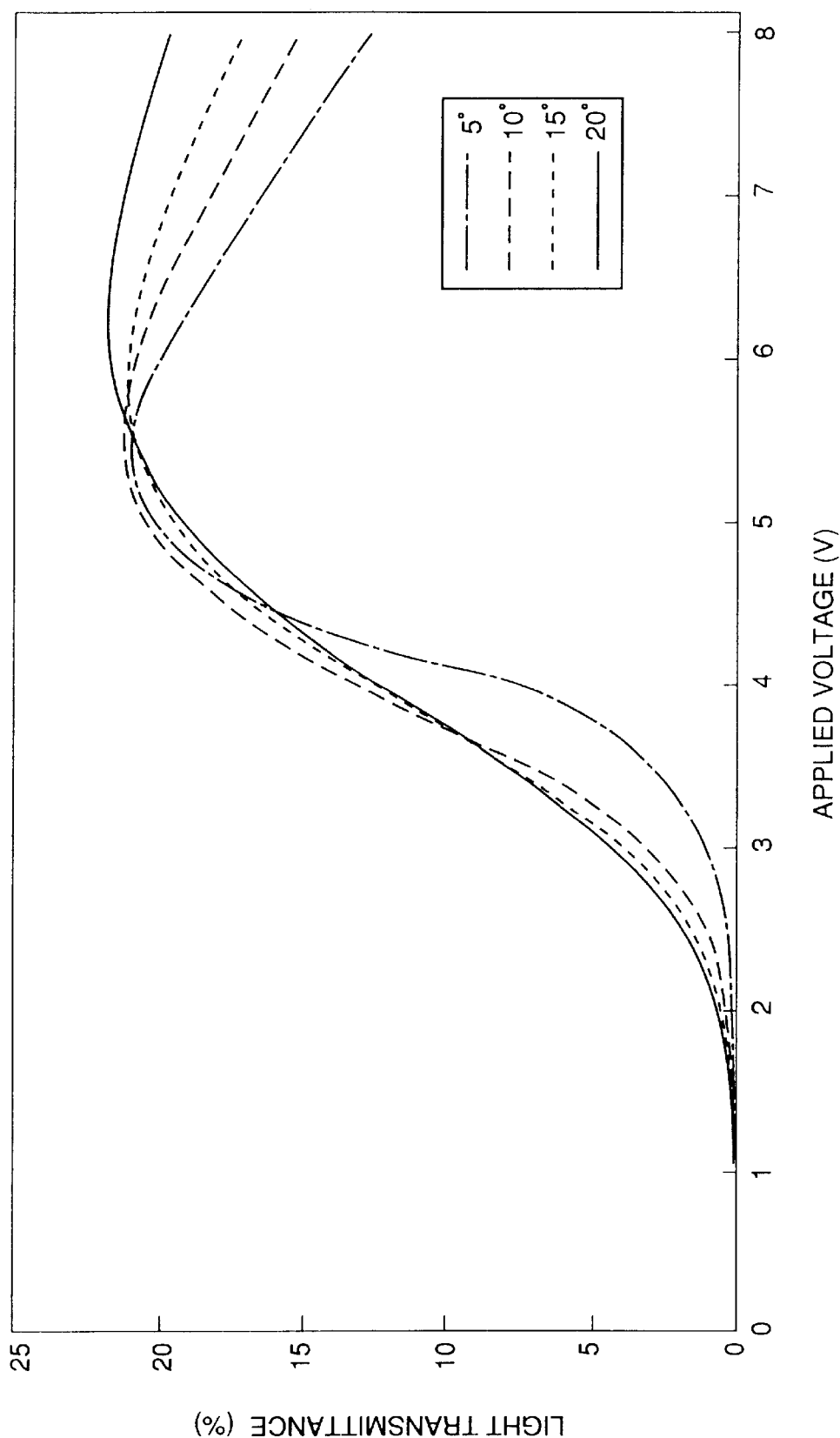
FIG. 13 shows variation of light transmittances $T/T_0$ related to applied voltages using the average aligning treatment angle $\phi$AV as a parameter.

Referring to FIG. 13, description will proceed to the reason why the average aligning treatment angle φAV is not less than ten degrees (10°). In FIG. 13, abscissa and ordinate represent the applied voltage (V) and the light transmittance $T/T_0$ (%), respectively. FIG. 13 shows variation of the light transmittance $T/T_0$ related to the applied voltage using the average aligning treatment angle φAV as a parameter when the average aligning treatment angle φAV is equal to five, ten, fifteen, and twenty degrees.

As described above, it will be assumed that the liquid crystal molecules 301 are aligned upon no generation of the lateral electric field so that an average aligning treatment direction defined by the average aligning treatment angle φAV is perpendicular to the light transmission axis of the TFT side polarizer 140 and is parallel to the light transmission axis of the CF side polarizer 240. In this event, a relationship between the light transmittance $T/T_0$ and the applied voltage for various average aligning treatment angles φAV is illustrated in FIG. 13. From 13, it is understood that the light transmittance $T/T_0$ for the applied voltage changes steeply when the average aligning treatment angle φAV is small. That is, it is difficult to carry out proper adjustment of gradation when the average aligning treatment angle φAV is small. As a result, in this embodiment of the present invention, an intra-plane angle equal to or more than ten degrees is selected as the average aligning treatment angle φAV in order to make the adjustment of gradation easy.

As apparent from the above-mentioned description, it is possible for the liquid crystal device according to this embodiment of the present invention to obtain the characteristic of the viewing angle being the right-and-left symmetrical and being the up-and-down symmetrical by twist aligning the liquid crystal molecules 301 by the twist angle φTW which is determined by a predetermined relationship related to the average aligning treatment angle φAV. In addition, it is possible to provide the liquid crystal display device in which adjustment of gradation is easy and which has the high light transmittance by selecting the average aligning treatment angle φAV from the range between ten degrees and forty-five degrees.

Although the description has been made as regards a case where the first aligning treatment direction of the TFT side alignment layer 130 and the second aligning treatment direction of the CF side alignment layer 230 are slightly shifted from the so-called anti-parallel rubbing state where the first aligning treatment direction of the TFT side alignment layer 130 and the second aligning treatment direction of the CF side alignment layer 230 extend in the opposite direction each other, the present invention may not be restricted to this case. For example, the liquid crystal molecules 301 may be twist aligned by slightly shifting the first aligning treatment direction of the TFT side alignment layer 130 and the second aligning treatment direction of the CF side alignment layer 230 in accordance with the above-mentioned condition from the so-called parallel rubbing state where the first aligning treatment direction of the TFT side alignment layer 130 and the second aligning treatment direction of the CF side alignment layer 230 extend in the same direction.

Figure 14:
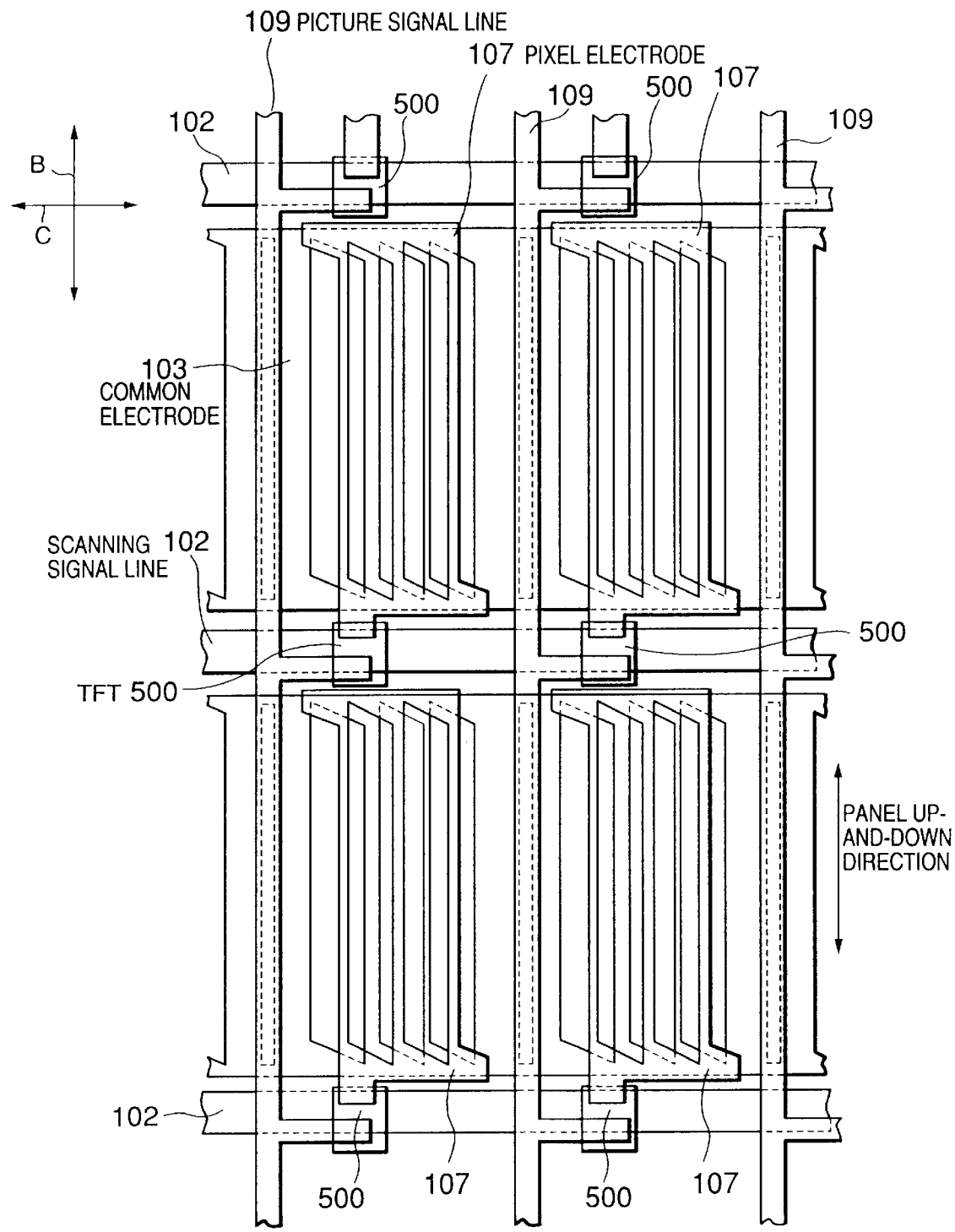
FIG. 14 is a front view showing a relationship among electrodes in structure where a plurality of pixels are aligned in a matrix or array fashion in a liquid crystal display device according to a second embodiment of this invention.
Figure 15:
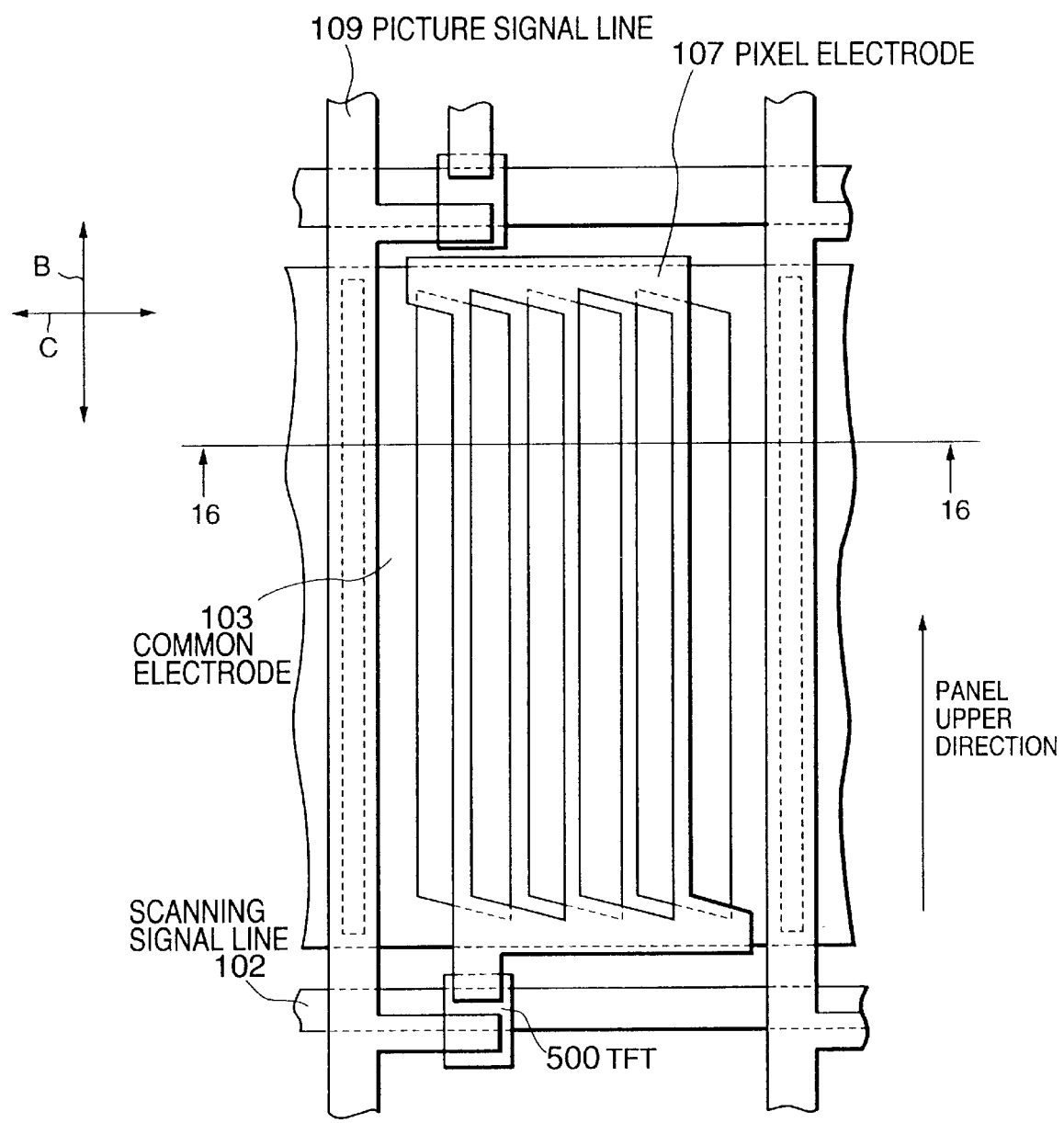
FIG. 15 is a front view showing structure of a part corresponding to one pixel in the liquid crystal display device illustrated in FIG. 14.
Figure 16:
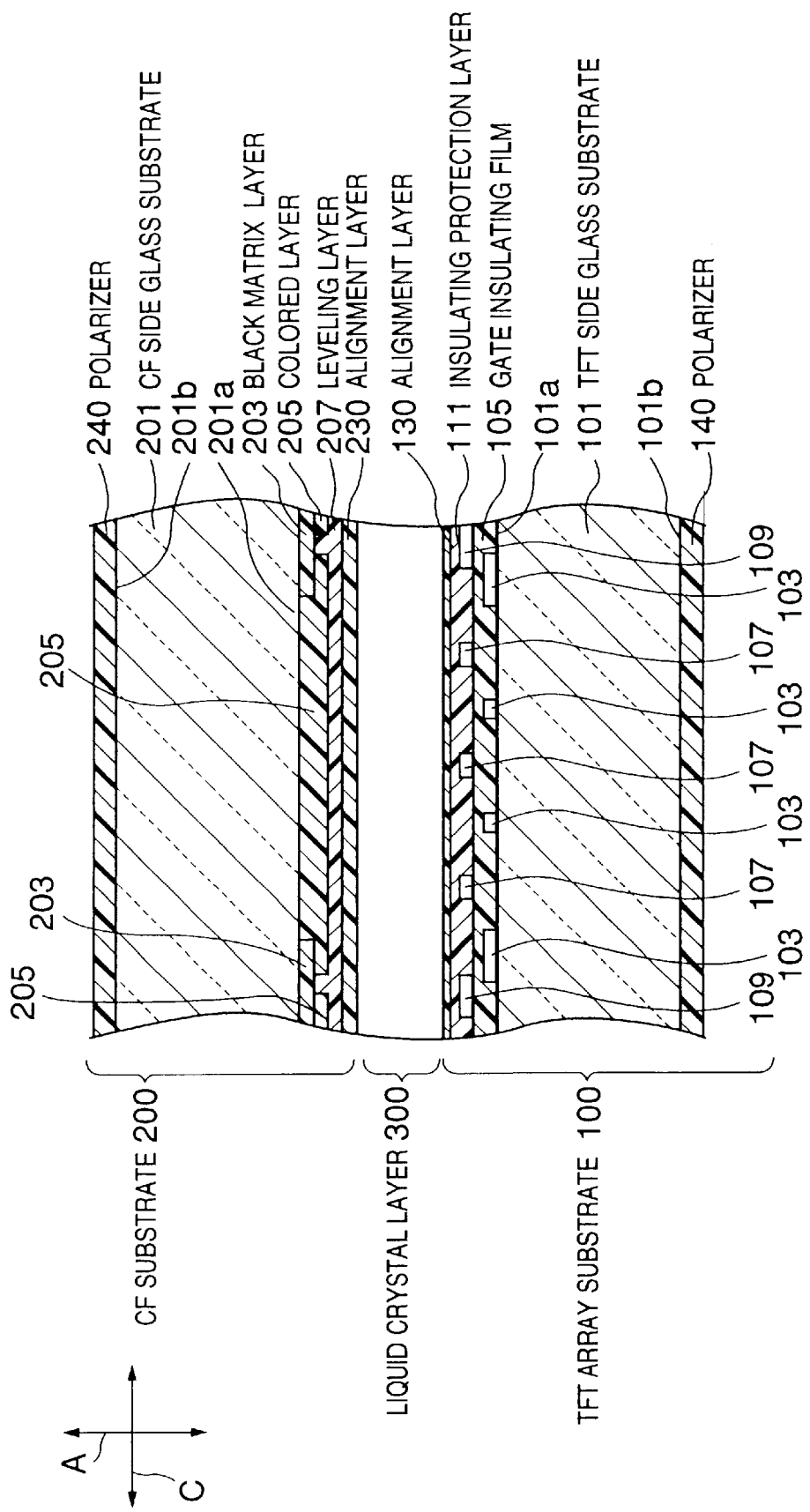
FIG. 16 is a sectional view taken substantially along the lines 16—16 of FIG. 15.
Figure 17:
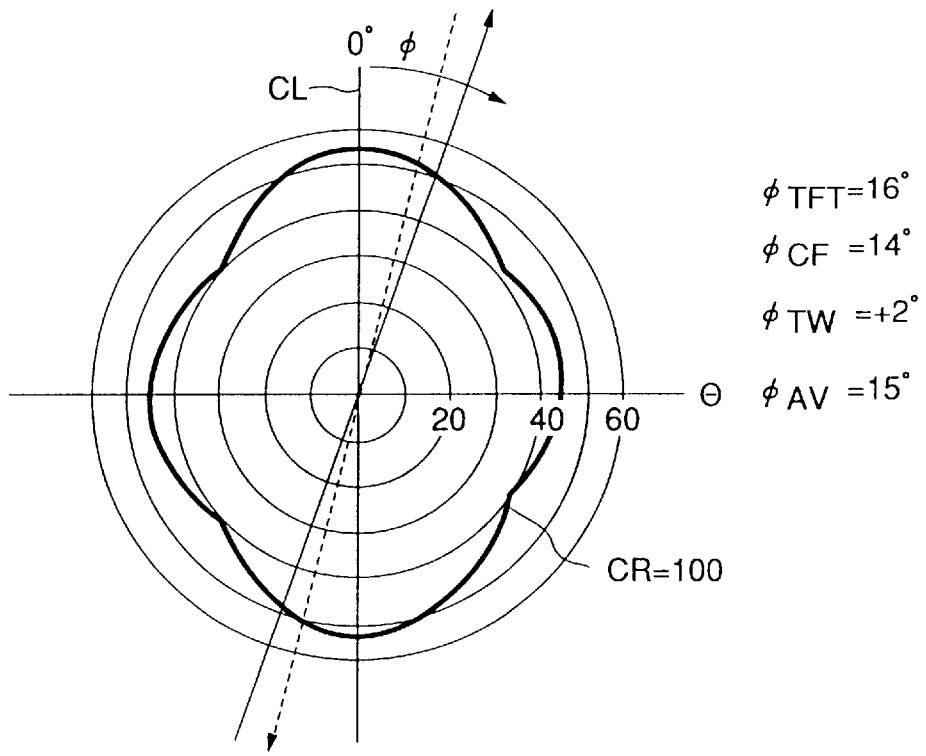
FIG. 17 is a view cone showing characteristic of a viewing angle in the liquid crystal display device illustrated in FIG. 14.

Referring to FIGS. 14 through 17, description will proceed to a liquid crystal display device according to a second embodiment of this invention. FIG. 14 is a front view showing a relationship among electrodes in structure where a plurality of pixels are aligned a matrix or array fashion. FIG. 15 is a front view showing structure of a part corresponding to one pixel in the liquid crystal display device illustrated in FIG. 14. FIG. 16 is a sectional view taken substantially along the lines 16—16 of FIG. 15. FIG. 17 is a view showing characteristic of a visual field angle in the liquid crystal display device illustrated in FIG. 14.

As shown in FIG. 14, the illustrated liquid crystal display device comprises a plurality of pixels arranged in the configuration of a matrix with m rows and n columns, where m and n represent first and second positive integers each of which is not less than two. The m rows of the pixels are disposed with a horizontal or lateral space left between the adjacent pixels in the panel up-and-down direction or the vertical direction B. Likewise, the n columns of the pixels are disposed with a vertical space left between the adjacent pixels in the panel right-and-left direction or the lateral direction C.

The liquid crystal display device further comprises m scanning signal lines 102 adjacent to the m rows of the pixels at one sides thereof. Each of the m scanning signal lines 102 extends in the panel right-and-left direction or the lateral direction C and is arranged in the horizontal or lateral space between the pixels. Each scanning signal line 102 is called a gate bus line (G-Bus). The liquid crystal display device comprises n picture signal lines 109 adjacent to the n columns of the pixels at one sides thereof. Each of the n picture signal lines 109 extends in the panel up-and-down direction or the vertical direction B and is arranged in the vertical space between the pixels. Each picture signal line 109 is referred to as a drain bus line (D-Bus) 109.

The liquid crystal display device further comprises a common electrode 103 supplied with a reference voltage. In the example being illustrated, the common electrode 103 is divided into m row common electrode pieces which correspond to the respective m rows of pixels between the m scanning signal lines 102 as shown in FIG. 14. Each of the m row common electrode pieces extends in the panel right-and-left direction or the lateral direction C. The common electrode 103 is made of a transparent conductive film such as Indium Tin Oxide (ITO). The liquid crystal display device comprises a plurality of pixel electrodes 107 which correspond to the pixels, respectively. That is, the pixel electrodes 107 are arranged in the configuration of the matrix with m rows and n columns. The pixel electrodes 107 are also made of the transparent conductive film such as Indium Tin Oxide (ITO). The liquid crystal display device comprises a plurality of thin film transistor (TFTs) 500 acting as switching elements which are adjacent to the pixel electrodes 107. More specifically, the thin film transistors 500 also are arranged in the configuration of the matrix with m rows and n columns and are formed on the m scanning signal lines 102 as shown in FIG. 14. In the manner known in the art, each thin film transistor 500 has a gate electrode, a drain electrode, and a source electrode.

The m scanning signal lines 102 correspond to the m rows of the thin film transistors 500. Specifically, each scanning signal line 102 is connected to the gate electrodes of the thin film transistors 500 which are equal in number to n and which extend in the right-and-left direction or the lateral direction C along the scanning signal line 102 in question. Likewise, the n picture signal line 109 correspond to the n columns of the thin film transistors 500. Particularly, each picture signal line 109 is connected to the drain electrodes of the thin film transistors which are equal in number to m and which extend in the up-and-down direction or the vertical direction B along the picture signal line 109 in question. As shown in FIG. 15, the pixel electrodes 107 are connected to the source electrodes of the respective tin film transistors 500.

As shown in FIG. 16, each pixel comprises the TFT array substrate 100, the CF substrate 200, and the liquid crystal layer 300 which is interposed between the TFT array substrate 100 and the CF substrate 200. The TFT array substrate 100 and the CF substrate 200 are spaced via the liquid crystal layer 300 apart in the longitudinal direction A.

The TFT array substrate 100 comprises the TFT side glass substrate 101 which is a flat plate in shape. The TFT array substrate 100 has the TFT principal surface 101a and the TFT back surface 101b which are opposed to each other via the TFT side glass substrate 101. Each of the TFT principal surface 101a and the TFT back surface 101b is referred to as the panel flat surface. The TFT array substrate 100 further comprises the common electrode 103 formed on the TFT principle surface 101a and the gate insulating film 105 formed on the TFT principle surface 101a so as cover the common electrode 103. The common electrode 103 extends in the panel up-and-down direction or the vertical direction B as shown in FIG. 15. The TFT array substrate 100 also comprises the pixel electrode 107 formed on the gate insulating film 105, the picture signal line 109, an insulating protection layer (a passivation layer) 111 formed on the gate insulating film 105 so as to cover the pixel electrode 107 and the picture signal line 109, and the TFT side alignment layer 130 formed on the passivation layer 111. The pixel electrode 107 and the picture signal line 109 also extend in the panel up-and-down direction or the vertical direction B as shown in FIG. 15. The TFT array substrate 100 further comprises the TFT side polarizer 140 attached to the TFT back surface 101b.

The CF substrate 200 comprises the CF side glass substrate 201 which is plate in shape. The CF side glass substrate 201 has the CF principle surface 201a and the CF back surface 201b which are opposed to each other via the CF side glass substrate 201. Each of the CF principle surface 201a and the CF back surface 201a is also referred to as the panel flat surface. The CF substrate 200 further comprises a black matrix layer 203 in a grid pattern and a colored layer 205 which are formed on the CF principle surface 201a, a leveling layer 207 formed on the black matrix layer 203 and the colored layer 205, the CF side alignment layer 230 formed on the leveling layer 207, and the CF side polarizer 240 attached to the CF back surface 201b.

As described above, each of the TFT side polarizer 140 and the CF side polarizer 240 has the light transmission axis and the light absorption axis which are perpendicular to each other. In the example being illustrated, the light transmission axis of the TFT side polarizer 140 is perpendicular to that of the CF side polarizer 240. In other words, the light absorption axis of the TFT side polarizer 140 is perpendicular to that of the CF side polarizer 240. The light transmission or absorption axis of each of the TFT side polarizer 140 and the CF side polarizer 240 inclines to the right or left from the panel up-and-down direction or the vertical direction B. In addition, each of the TFT side alignment layer 130 and the CF side alignment layer 230 has a rubbing direction or an alignment processed direction for liquid crystal molecules. The rubbing direction of each of the TFT side alignment layer 130 and the CF side alignment layer 230 is substantially parallel to the light absorption axis of the TFT side polarizer 140 and is substantially perpendicular to the light absorption axis of the CF side polarizer 240. In other words, the rubbing direction of each of the TFT side alignment layer 130 and the CF side alignment layer 230 is substantially perpendicular to the light transmission axis of the TFT side polarizer 140 and is substantially perpendicular to the light transmission axis of the CF side polarizer 240.

The liquid crystal layer 300 is interposed between the TFT array substrate 100 and the CF substrate 200 with the TFT side alignment layer 130 and the CF side alignment layer 230 opposed to each other as shown in FIG. 16. The liquid crystal layer 300 comprises the liquid crystal molecules (not shown) which lie in the space enclosed with the TFT side alignment layer 130 and the CF side alignment layer 230.

Description will proceed to operation in the liquid crystal display device illustrated in FIGS. 14 through 16. It will be assumed that one of the m scanning signal lines 102 is selected as a selected scanning signal line. In this event, the selected scanning signal line turns n thin film transistors 500 thereon on to select n pixel electrodes 107 connected to the n thin film transistors. The n pixel electrodes 107 are supplied with voltages from the n picture signal lines 109 to generate lateral electric fields between the n pixel electrodes 107 and the common electrode 103. As a result, it is possible to make the lateral electric fields rotate the liquid crystal molecules in the plane which is substantially parallel to the surfaces of the substrates 100 and 200.

As shown in FIG. 17, it is characteristic of the second embodiment of the present invention to slightly twist the liquid crystal molecules by slightly shifting the aligning treatment directions from the anti-parallel rubbing state. In the example being illustrated, the TFT side aligning treatment angle φTFT and the CF side aligning treatment angle φCF are equal to 16° and 14°, respectively. That is, the twist angle φTW is equal to +2° because the twist angle φTW is given by subtracting the CF side aligning treatment angle φCF from the TFT side aligning treatment angle φTFT, namely:

$$\phi TW = \phi TFT - \phi CF.$$

In addition, the average aligning treatment angle φAV is equal to 15°.

Accordingly, the equivalent contrast curve in CR=100 is symmetrical in both of the panel up-and-down direction and the panel right-and-left direction by twist aligning the liquid crystal molecules with the liquid crystal molecules twisted by the twist angle φTW equal to +20°.

In the second embodiment of the present invention, it will be presumed that the relationship between the average aligning treatment direction defined by the average aligning treatment angle φAV upon no generation of the lateral electric field and the light transmission axis of the TFT side polarizer 140 and the relationship between the average aligning treatment direction upon no generation of the lateral electric field and the light transmission axis of the CF side polarizer 240 are as follows. More specifically, the TFT side polarizer 140 has the light transmission axis which is perpendicular to the average aligning treatment direction. That is, an included intra-plane angle between the light transmission axis of the TFT side polarizer 140 and the panel upper direction is equal to minus seventy-five degrees (−75°) or plus one hundred and five degrees (+105°). In addition, the CF side polarizer 240 has the light transmission axis which is parallel to the average aligning treatment direction. That is, another included intra-plane angle between the light transmission axis of the CF side polarizer 240 and the panel upper direction is equal to plus fifteen degrees (+15°).

Furthermore, in the second embodiment of the present invention, a chiral dopant or additive is doped or added to the liquid crystal layer 300 in order to stabilize the twist alignment. Such a liquid crystal doped with the chiral dopant may be ZLI4792 sold by Merk Corp. that has a property of matter where Δ n is 0.094 and Δ ∈ is 5.2. The second embodiment of the present invention uses, as the liquid crystal doped with the chiral dopant, one having helical structure where a helical pitch is equal to 96 μm.

By making a comparison between the equivalent contrast curve in prior art illustrated in FIG. 3 and the equivalent contrast curve according to the second embodiment of the present invention illustrated in FIG. 17, it is understood that the center line CL coincides with the panel upper direction in the second embodiment of the present invention. That is, according to structure of the second embodiment of the present invention, it is possible to obtain the equivalent contrast curve which is symmetrical in both of the panel right-and-left direction and in the panel up-and-down direction. In addition, in the equivalent contrast curve according to the second embodiment of the present invention, the viewing angle in the panel right-and-left direction in CR=100 is about equal to forty-five degrees (45°) as illustrated in FIG. 17.

In addition, according to the second embodiment of the present invention, the average aligning treatment angle φAV is equal to fifteen degrees (15°) and belongs to the range between ten degrees and the forty-five degrees. Accordingly, it is understood from FIG. 13 that variation of the light transmittance has no abrupt rising in accordance with variation of the applied voltage. As a result, the second embodiment of the present invention provides the liquid crystal display device in which adjustment of gradation or gray scale is easy and which has a high light transmittance.

Figure 18:
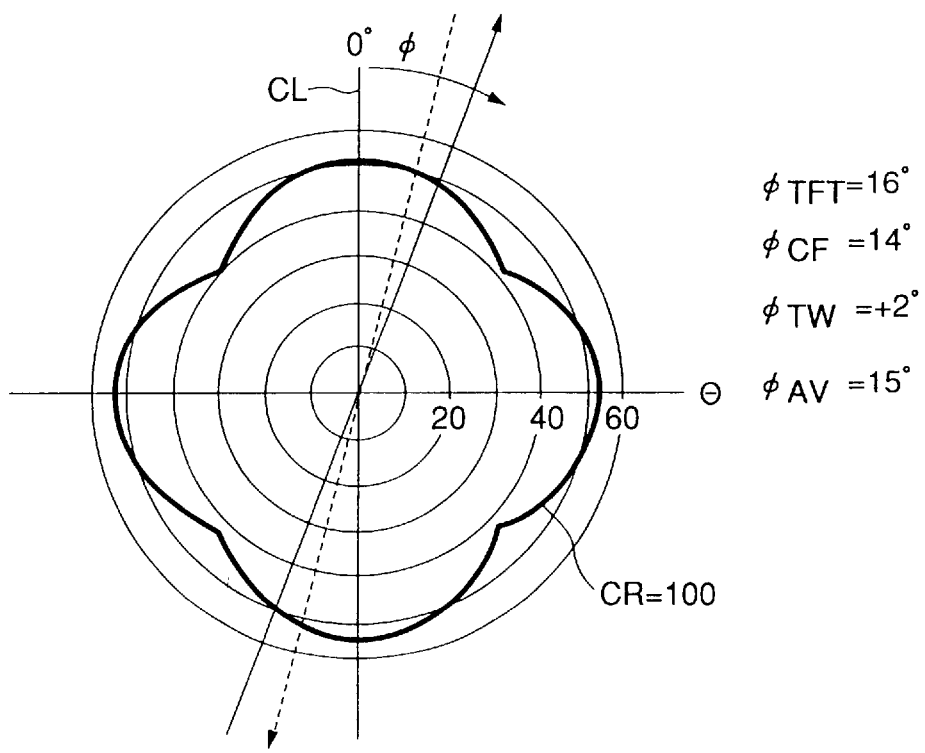
FIG. 18 is a view cone showing characteristic a viewing angle in a liquid crystal display device according to a third embodiment of this invention.

Referring to FIG. 18, description will proceed to a liquid crystal display device according to a third embodiment of this invention. The illustrated liquid crystal display device according to the third embodiment of this invention is similar in structure and operation to the liquid crystal display device according to the second embodiment of this invention illustrated in FIGS. 14 through 17 except that the liquid crystal display device is implemented on the premise that the parallel rubbing is made in lieu of the anti-parallel rubbing.

As shown in FIG. 18, it is characteristic of the third embodiment of the present invention to slightly twist the liquid crystal molecules by slightly shifting the alignment processed directions from the parallel rubbing state. In the example being illustrated, the TFT side aligning treatment angle φTFT and the CF side aligning treatment angle φCF are equal to 16° and 14°, respectively. That is, the twist angle φTW is equal to +2° because the twist angle φTW is given by subtracting the CF side aligning treatment angle φCF from the TFT side aligning treatment angle φTFT, namely:

$$\phi TW = \phi TFT - \phi CF.$$

In addition, the average aligning treatment angle φAV is equal to 15°. Accordingly, the equivalent contrast curve in CR=100 is symmetrical in both of the panel up-and-down direction and the panel right-and-left direction by twist aligning the liquid crystal molecules with the liquid crystal molecules twisted by the twist angle φTW equal to +2°.

Like the second embodiment of the present invention, in the third embodiment of the present invention, the liquid crystal molecules are aligned upon no generation of the lateral electric field so that the average aligning treatment direction defined by the average aligning treatment angle φAV is perpendiclar to the light transmission axis of the TFT side polarizer 140 and so that the average aligning treatment direction is parallel to the light transmission axis of the CF side polarizer 240. In addition, like the second embodiment of the present invention, in the third embodiment of the present invention, the chiral dopant or additive is doped or added to the liquid crystal layer 300 in order to stabilize the twist alignment.

By making a comparison between the equivalent contrast curve in prior art illustrated in FIG. 3 and the equivalent contrast curve according to the third embodiment of the present invention illustrated in FIG. 18, it is understood that the center line CL of the equivalent contrast curve coincides with the panel upper direction in the third embodiment of the present invention. That is, according to structure of the third embodiment of this invention, it is possible to obtain the equivalent contrast curve which is symmetrical in both of the panel right-and-left direction and in the panel up-and-down direction.

In addition, according to the third embodiment of the present invention, the average aligning treatment angle φAV is equal to fifteen degrees (15°) and belongs to the range between ten degrees and the forty-five degrees. Accordingly, it is understood from FIG. 13 that variation of the light transmittance has no abrupt rising in accordance with variation of the applied voltage. As a result, the third embodiment of the present invention provides the liquid crystal display device in which adjustment of gradation or gray scale is easy and which has a high light transmittance.

Furthermore, in the equivalent contrast curve according to the third embodiment of the present invention, the viewing angle in the panel right-and-left direction in CR=100 is equal to about fifty-two degrees (52°) as illustrated in FIG. 18 and is wider than that in the second embodiment of the present invention (forty-five degrees (45°)). That is, the liquid crystal display device according to the third embodiment of the present invention has a good characteristic of the viewing angle in comparison with that of the liquid crystal display device according to the second embodiment of the present invention.

While this invention has thus far been described in conjunction with few preferred embodiments thereof, it will now be readily possible for those skilled in the art to put this invention into various other manners. For example, the liquid crystal molecules may be rotated in a counterclockwise direction in accordance with the lateral electric field by aligning the liquid crystal molecules so that the director for each liquid crystal molecule inclines to the left side from the panel up-and-down direction upon no generation of the lateral electric field although the liquid crystal molecules are rotated in a clockwise direction in accordance with the lateral electric field in the above-mentioned embodiments by aligning the liquid crystal molecules so that the director for each liquid crystal molecule inclines to the right side from the panel up-and-down direction upon no generation of the lateral electric field.

What is claimed is:

1. A liquid crystal display device comprising:
   a first substrate having a first principal surface;
   a first alignment layer formed on the first principal surface of said first substrate, said first alignment layer being subjected to a first aligning treatment in a first aligning treatment direction;
   a second substrate having a second principal surface opposed to the first principal surface with a space left therebetween;
   a second alignment layer formed on the second principal surface of said second substrate, said second alignment layer being subjected to a second aligning treatment in a second aligning treatment direction which shifts from the first aligning treatment direction by a predetermined slight angle; and
   a liquid crystal layer interposed between said first and said second alignment layers, said liquid crystal layer comprising a plurality of liquid crystal molecules, said liquid crystal layer having a twist angle equal to the predetermined slight angle,
   wherein the first and the second aligning treatment directions incline to one side from the predetermined direction by first and second aligning treatment angles between which an intermediate angle is put as an average aligning treatment angle, wherein said twist angle is determined in accordance with the average aligning treatment angle and wherein when the first aligning treatment angle is less than the second aligning treatment angle, said twist angle is selected from a range represented by $(-0.27(90-x)^{0.73} \pm 1)$ degrees where x represents the average aligning treatment angle.

* * * * *